(12) United States Patent
Okazaki

(10) Patent No.: US 6,345,332 B1
(45) Date of Patent: Feb. 5, 2002

(54) BUS INTERCHANGE APPARATUS AND DUAL SYSTEM FOR ACCESSING A FAULT INFORMATION REGISTER WITHOUT REGARD TO BUFFER CONDITIONS

(75) Inventor: Makoto Okazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/243,386

(22) Filed: Feb. 1, 1999

(30) Foreign Application Priority Data

Aug. 14, 1998 (JP) ............................................ 10-229719

(51) Int. Cl.⁷ .......................... G06F 13/38; G06F 13/40
(52) U.S. Cl. ....................... 710/128; 710/126; 710/127; 710/53
(58) Field of Search ................................ 710/128, 127, 710/126, 53

(56) References Cited

U.S. PATENT DOCUMENTS 5,345,559 A * 9/1994 Okazaki et al. ............... 710/53
5,526,495 A * 6/1996 Shibata et al. ............... 710/127
5,933,613 A * 8/1999 Tanaka et al. ............... 710/128

FOREIGN PATENT DOCUMENTS

| JP | 56-52990 | 5/1981 |
| JP | 9-73429 | 3/1997 |
| JP | 63-86054 | 4/1998 |

* cited by examiner

*Primary Examiner*—Rupal Dharia
(74) *Attorney, Agent, or Firm*—Rosenman & Colin LLP

(57) ABSTRACT

A dual system has system buses that are connected to each other through bus interchange apparatuses and a cross bus to transfer information between the system buses. Each of the bus interchange apparatuses has a first bus controller (1) having a reception controller (6) and a transmission controller (8) that are connected to one (10) of the system buses, a second bus controller (2) having a reception controller (7) and a transmission controller (9) that are connected to the cross bus (11), buffers (3, 4) for relaying information between the first and second bus controllers (1, 2), and a register (5) directly accessible from the first and second bus controllers (1, 2) to write fault information thereto.

12 Claims, 25 Drawing Sheets

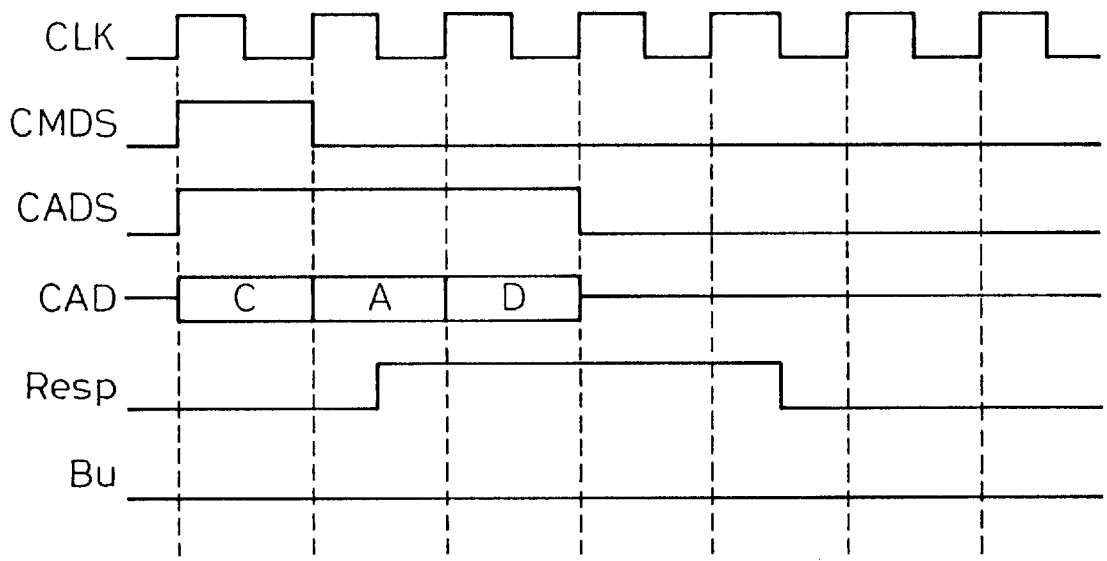
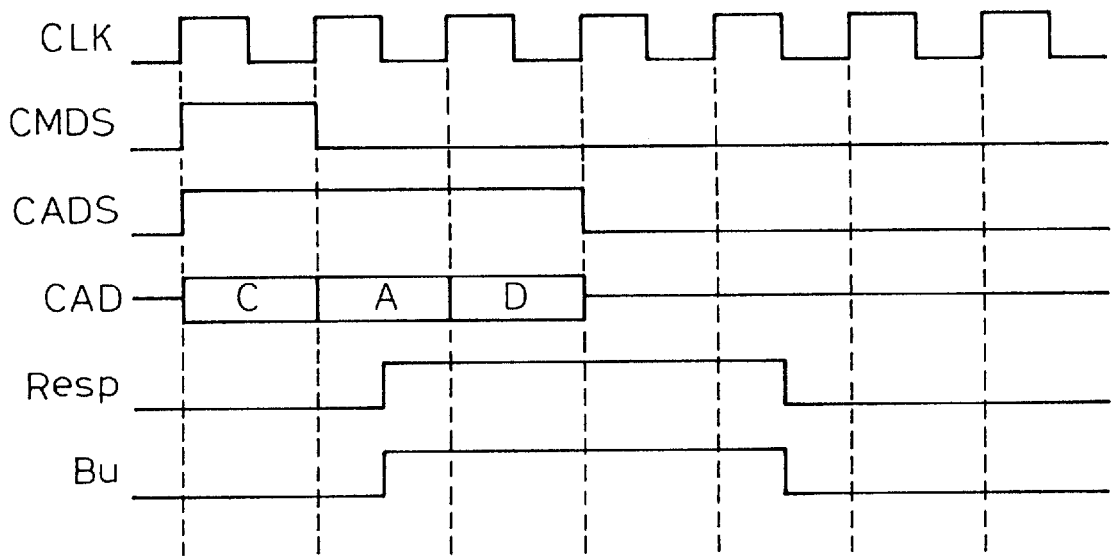

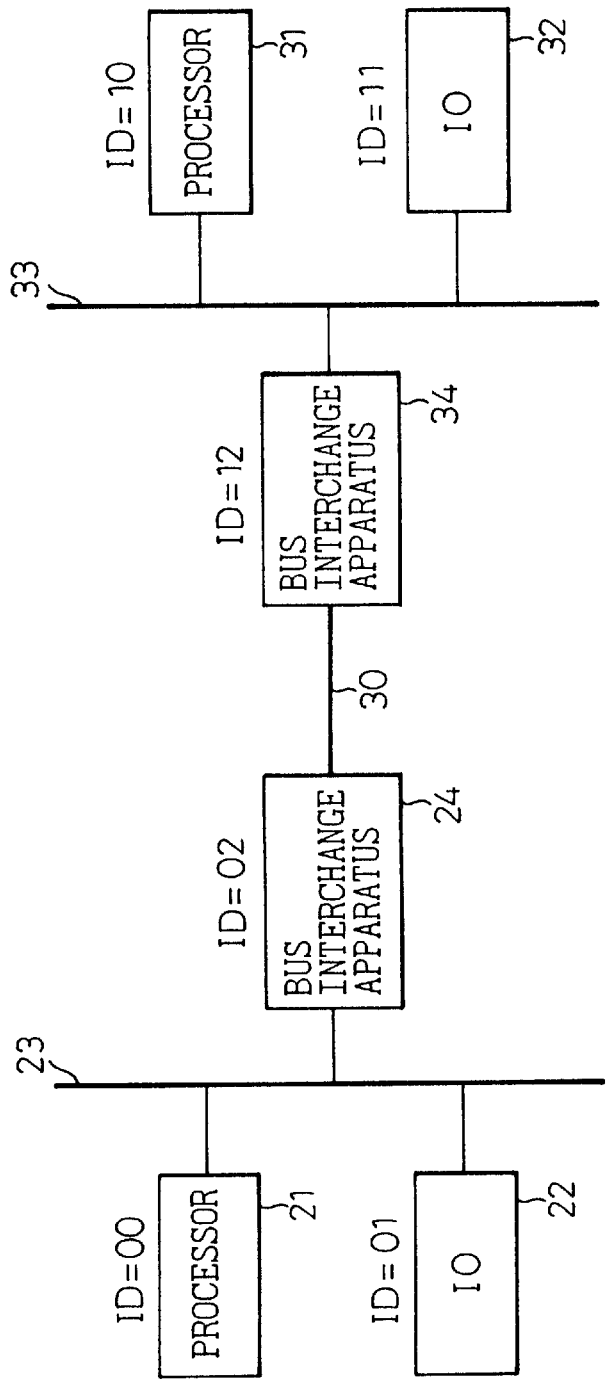
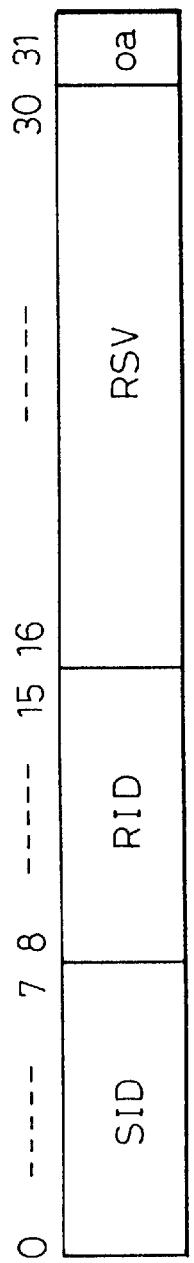

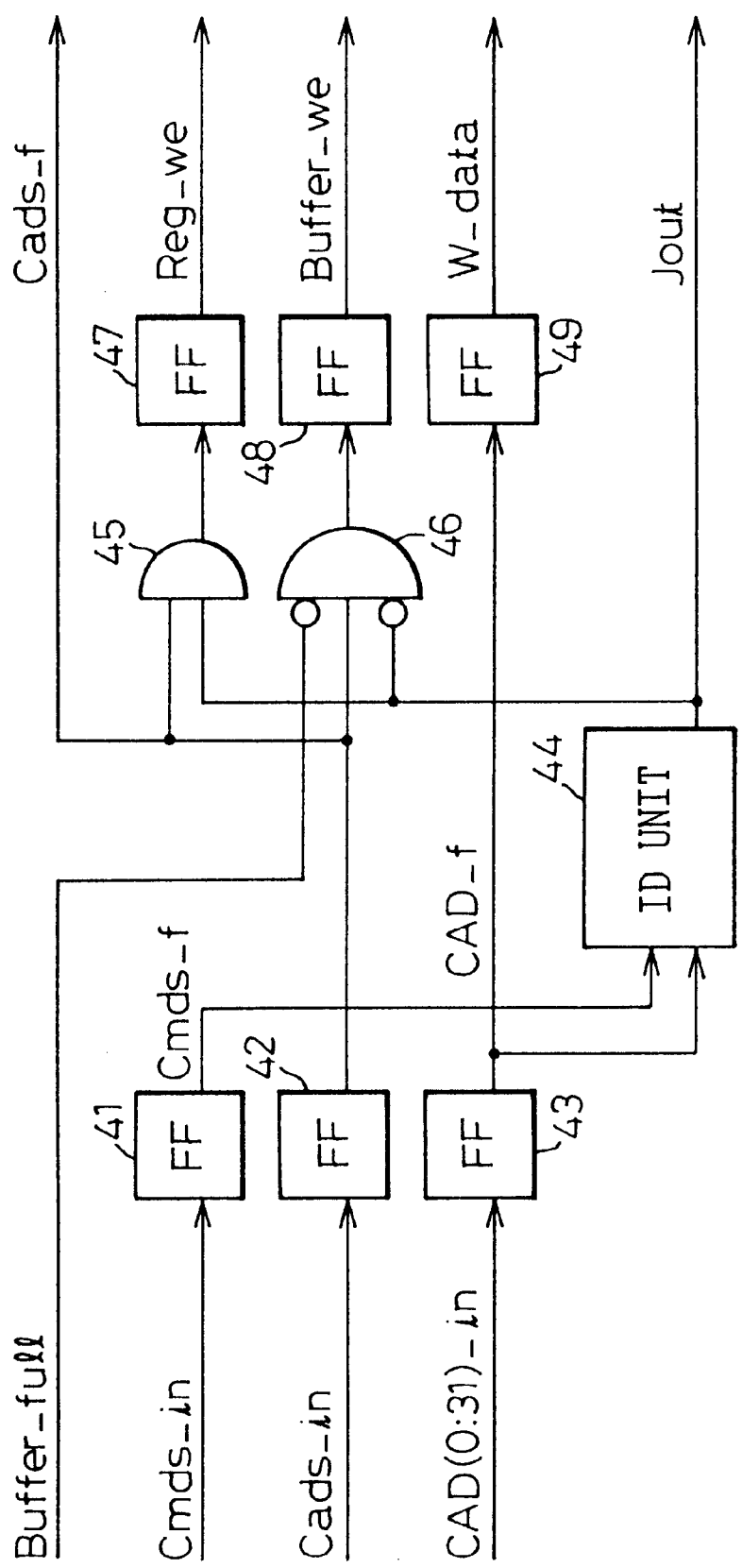

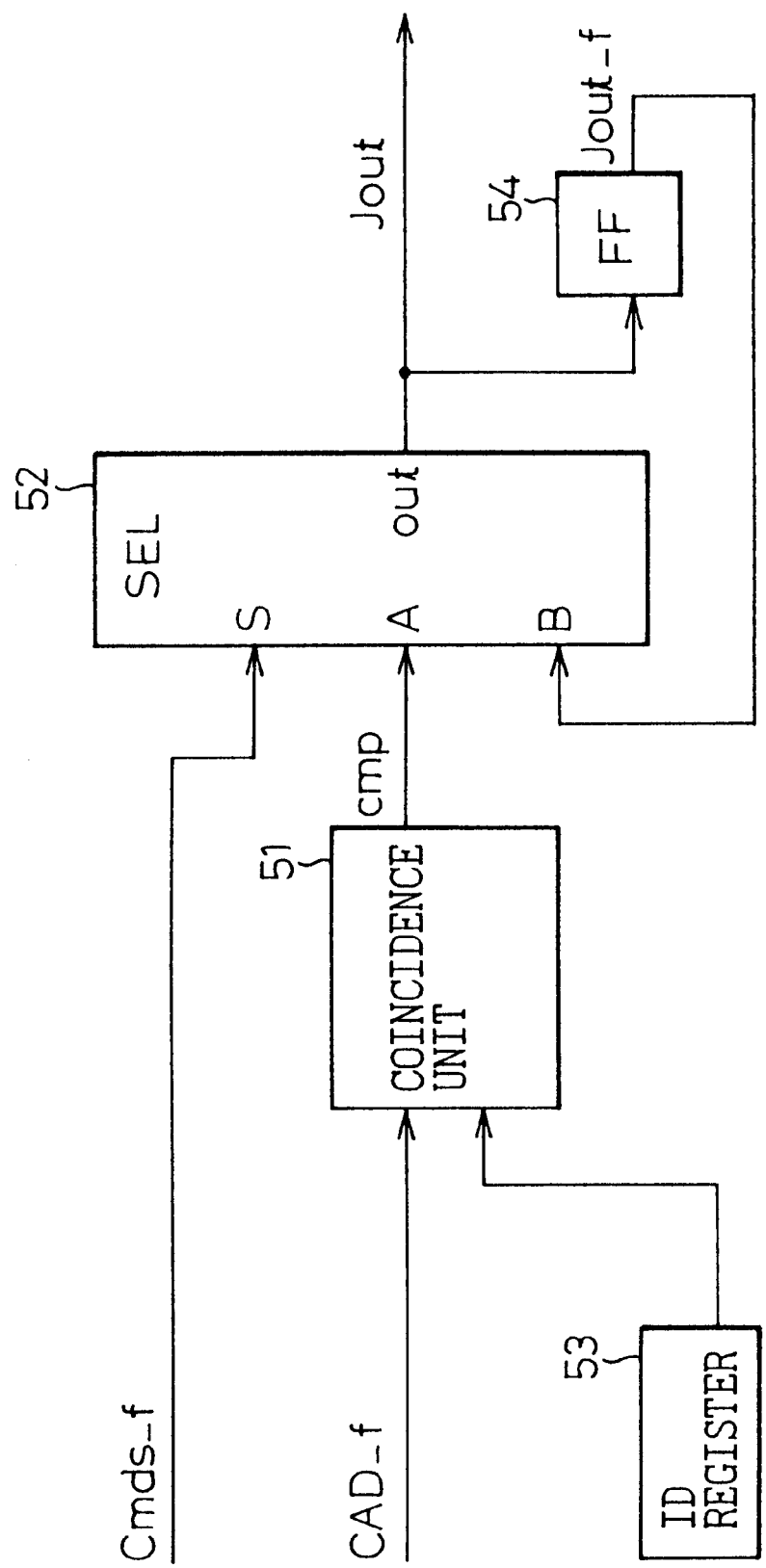

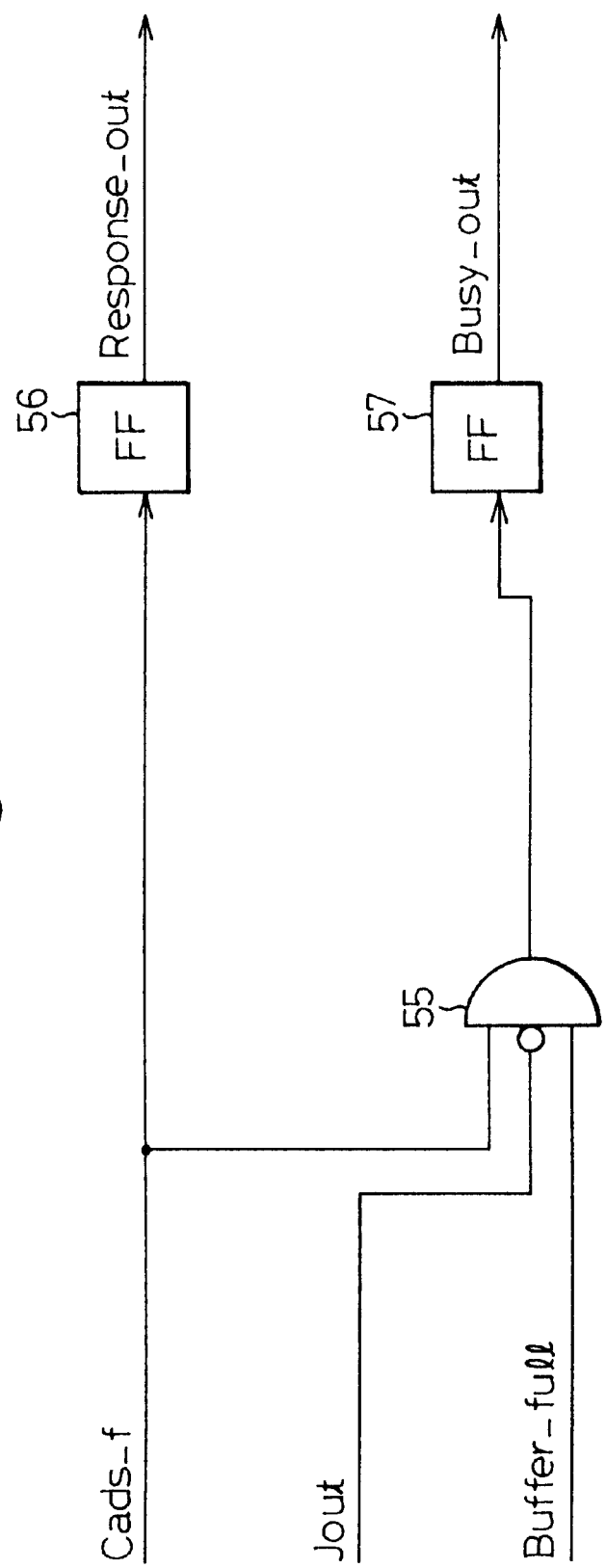

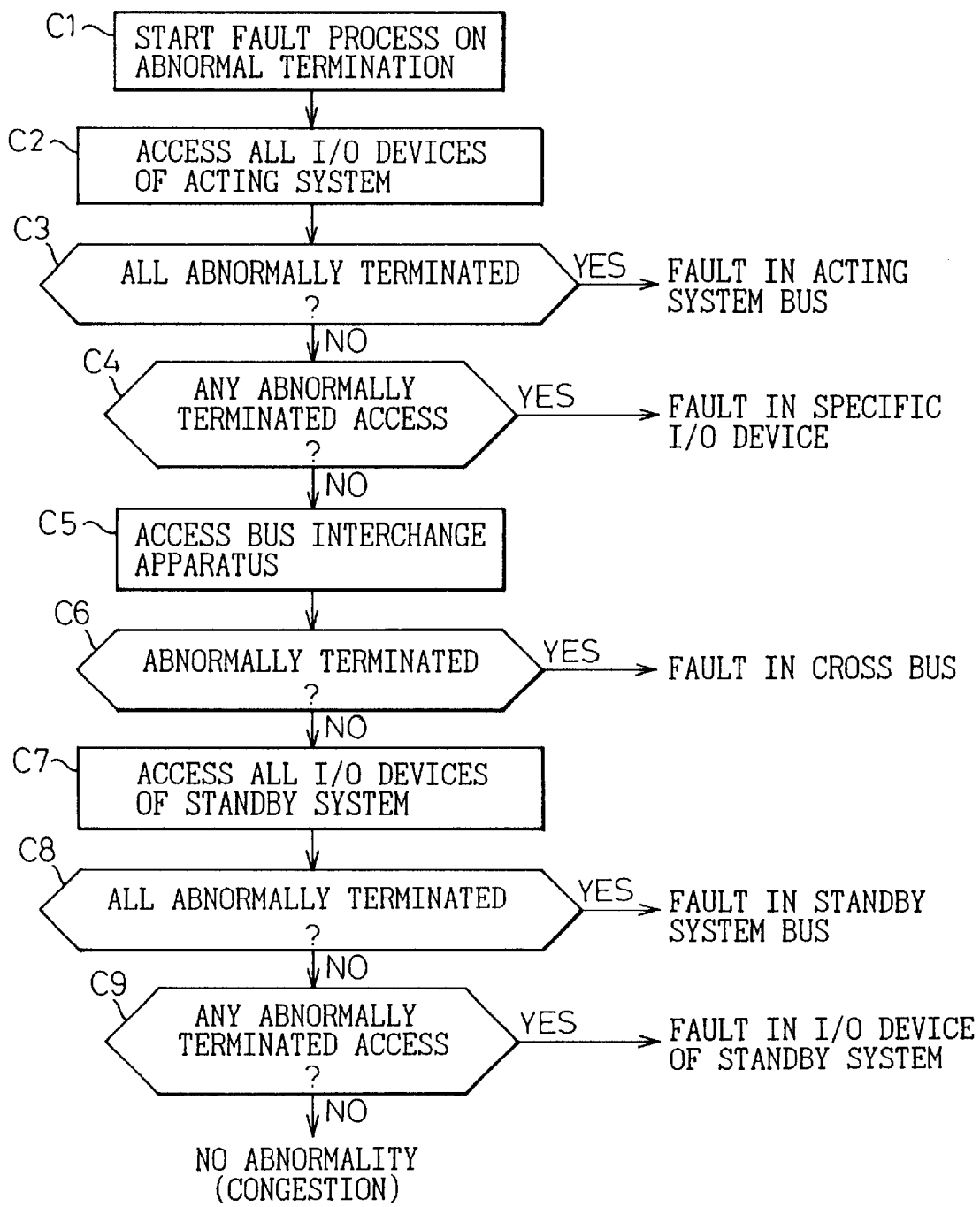

BUS INTERCHANGE APPARATUS AND DUAL SYSTEM FOR ACCESSING A FAULT INFORMATION REGISTER WITHOUT REGARD TO BUFFER CONDITIONS

BACKGROUND OF THE INVENTION

1. Field of the Invention

The present invention relates to a bus interchange apparatus and a dual system.

Information processing systems and control systems employ a dual system to improve the reliability thereof. The dual system includes a bus interchange apparatus to connect system buses to each other. There is a requirement to smoothly transfer data between the system buses through the bus interchange apparatus.

2. Description of the Related Art

In a dual system of the prior art, fault information held by a register of any one of the bus interchange apparatuses is accessible only through one buffer thereof. If a buffer has no free space, an access request for the register from a bus controller is not written into the buffer, and therefore, the bus controller is unable to access the register. If an access request for the register is written into the buffer and if data to be transferred is not read out of the buffer due to a fault on the cross bus side, there will be no way to access the register. If the buffer has no free space or if the contents of the buffer cannot be read, the bus controller is unable to access the register.

If the register is inaccessible, fault information and repair information will not be written into and read out of the register. It is impossible for the prior art to locate a fault or carry out a reset operation to deal with the fault. As a result, the prior art must reset and restart the system as a whole by suspending services provided by the system.

SUMMARY OF THE INVENTION

An object of the present invention is to provide a bus interchange apparatus and a dual system capable of accessing a register that holds fault information, etc., without regard to the conditions of buffers.

In order to accomplish the objects, the present invention provides a bus interchange apparatus for connecting first and second system buses to each other through a cross bus to interchange information between the first and second system buses. The apparatus has a first bus controller connected to the system bus, a second bus controller connected to the cross bus, buffers arranged between and connected to the first and second bus controllers, for relaying information between the first and second bus controllers, and a register to which fault information, etc., is written. The register is directly accessible from the first and second bus controllers.

The first and second bus controllers have reception controllers for writing information, which is to be transferred from a sender to a receiver, into the buffers if the buffers are not full, and if the buffers are full, sending a busy signal to the sender without writing the information into the buffers, and transmission controllers for reading the information out of the buffers and transmitting the same to the receiver. The reception controllers are able to write fault information, etc., into the register in response to an access request for the register irrespective of whether or not the buffers are full. The transmission controllers are able to read fault information, etc., out of the register in response to an access request for the register and send out the read information irrespective of whether or not the buffers are full.

The transmission controllers may have each a counter for counting the number of retry operations that are carried out when information read out of the buffer and transmitted to a receiver is not normally received by the receiver, and a unit for writing a retry-over signal into the register if the number of retry operations exceeds a retry limit.

The transmission controllers may have each a limit register for storing the retry limit and a coincidence unit for comparing the number of retry operations counted by the counter with the retry limit, and if they agree with each other, providing the retry-over signal.

The transmission controllers may have each a sender ID unit for identifying a sender, a counter provided for each sender to be identified by the sender ID unit, for counting the number of retry operations carried out for the sender, a limit register provided for each counter, for storing a retry limit for the counter, and a coincidence unit provided for each counter, for comparing the number of retry operations counted by the counter with the corresponding retry limit, and if they agree with each other, providing a retry-over signal.

The reception controllers may have each a unit for determining whether or not an access is to the register and a unit for writing information into the buffer if the access is not to the register and if the buffer is not full, and writing the information into the register irrespective of whether or not the buffer is full if the access is to the register.

The present invention also provides a dual system having first and second system buses that are connected to processors, respectively. The dual system employs bus interchange apparatuses having a cross bus for connecting the system buses to each other. Each of the bus interchange apparatuses has a first bus controller connected to one of the first and second system buses, a second bus controller connected to the cross bus, buffers arranged between and connected to the first and second bus controllers, for relaying information between the first and second bus controllers, and a register to which fault information, etc., is written and which is accessible directly from the first and second bus controllers. One of the system buses serving as a sender refers to the register to see if there is a fault in a location to which the bus interchange apparatus is connected, if the sender receives no response or an error response from the bus interchange apparatus to a request for transferring data from the sender to the other system bus serving as a receiver.

Alternatively, the sender may tray again to transfer the data to the receiver, if the register holds a retry-over signal and indicates no fault in the location to which the bus interchange apparatus is connected.

Alternatively, the sender may terminate the data transfer to the receiver, if the register holds a retry-over signal and indicates a fault in the receiver.

The bus interchange apparatuses of the dual system may each have any structure mentioned above.

BRIEF DESCRIPTION OF THE DRAWINGS

Other objects and features of the present invention will be described hereinafter in detail by way of preferred embodiments with reference to the accompanying drawings, in which:

FIG. 4 shows a transfer operation in the bus interchange apparatuses of FIG. 3;

FIG. 5 shows a transfer operation in the bus interchange apparatuses of FIG. 3;

FIGS. 6A and 6B shows IDs assigned to components of bus interchange apparatuses and a format for transferring IDs and data;

FIG. 7 shows a data reception controller of the bus controller of FIG. 2;

FIG. 8 shows an ID unit of the data reception controller of FIG. 7;

FIG. 9 shows a response transmission controller of the bus controller of FIG. 2;

FIG. 27 is a flowchart showing a fault process according to the prior art.

DESCRIPTION OF THE PREFERRED EMBODIMENTS

For better understanding of the embodiments of the present invention, the prior art will first be described with reference to FIGS. 25–27.

Figure 25:
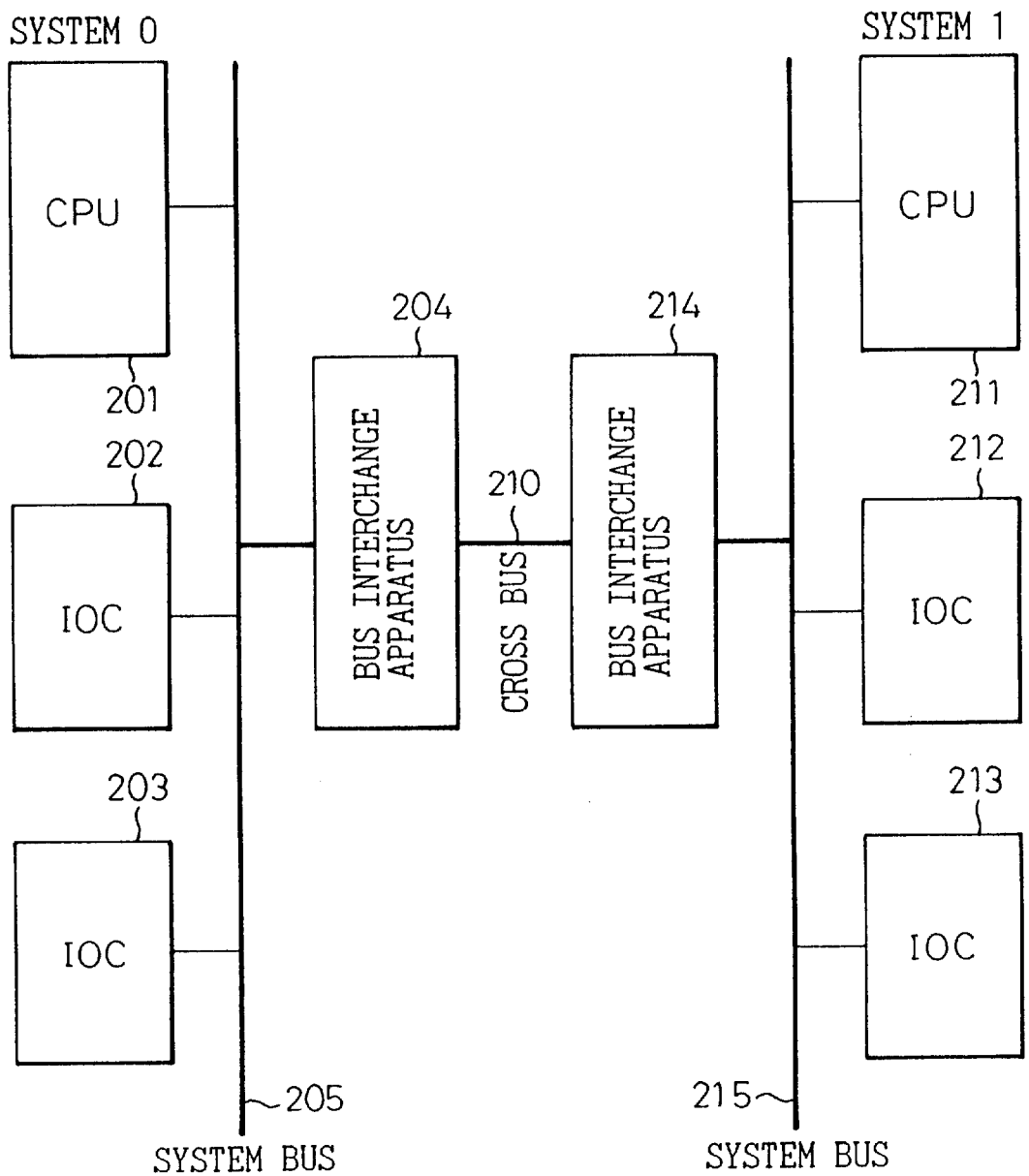
FIG. 25 shows a dual system.

FIG. 25 shows a dual system consisting of a system 0 and a system 1. The system 0 has a CPU 201, I/O controllers 202 and 203, and a system bus 205. The system 1 has a CPU 211, I/O controllers 212 and 213, and a system bus 215. The systems 0 and 1 also have memories and interfaces (not shown) connected to the system buses 205 and 215. The system buses 205 and 215 are connected to each other through bus interchange apparatuses 204 and 214 and a cross bus 210.

One of the systems 0 and 1 is an acting system and the other a standby system. The processors 201 and 211 process various pieces of information and control devices such as exchange channel devices. The systems 0 and 1 simultaneously carry out the same process, and the acting system provides a result of the process. To make the systems 0 and 1 provide identical process results, various information pieces must be transferred between the systems 0 and 1 through the bus interchange apparatuses 204 and 214 and cross bus 210.

Figure 26:
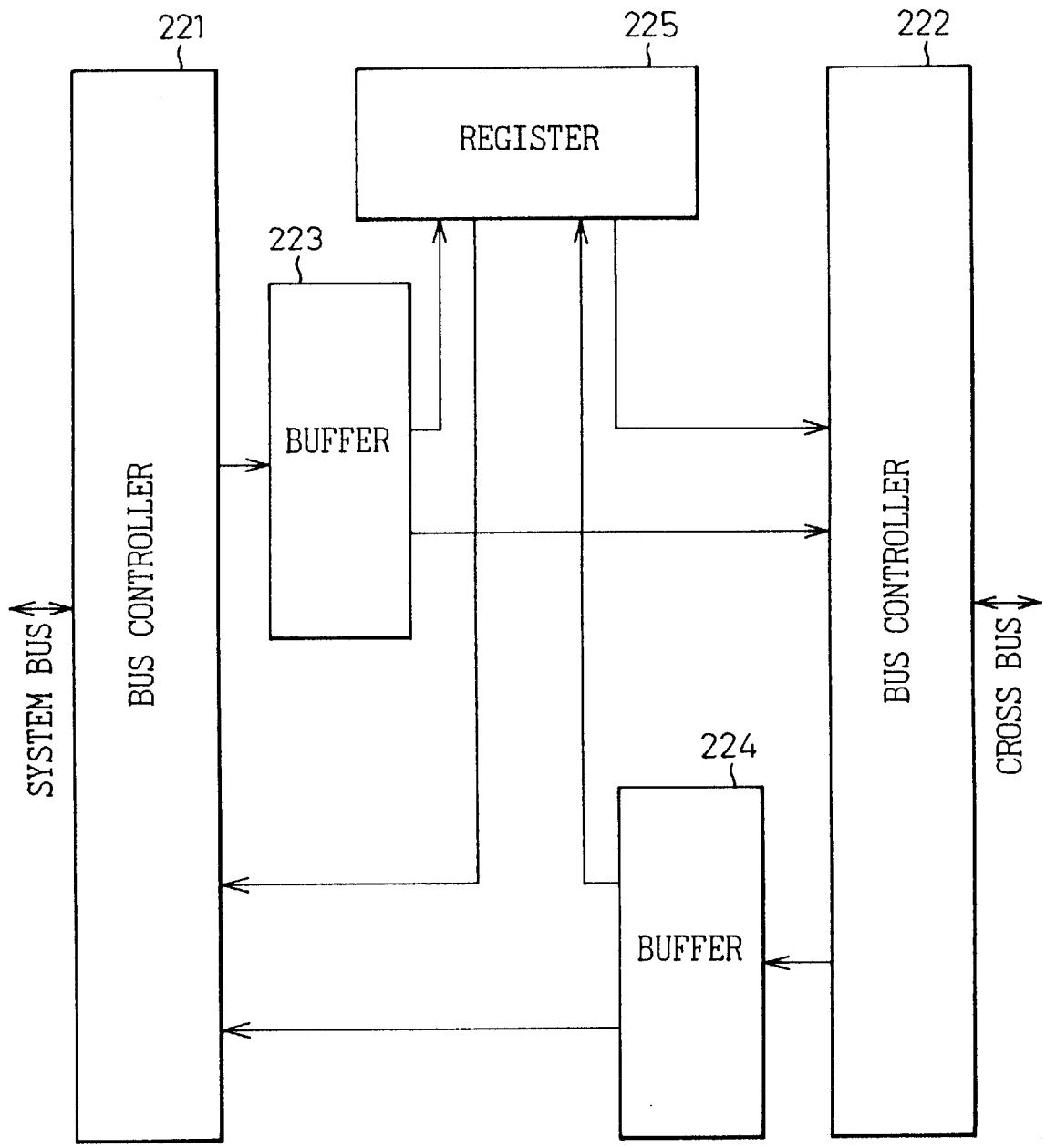
FIG. 26 shows essential parts of a bus interchange apparatus according to a prior art.

FIG. 26 shows the structure of a bus interchange apparatus according to a prior art applicable to the dual system of FIG. 25. The bus interchange apparatus has bus controllers 221 and 222, buffers 223 and 224, and a register 225 and works as any one of the bus interchange apparatuses 204 and 214 of FIG. 25. The bus controller 221 is connected to one of the system busses 205 and 215, and the bus controller 222 is connected to the cross bus 210. To transfer information composed of a command, an address, and data from the system 0 to the system 1, the bus controller 221 connected to the system 0 writes the information into the buffer 223. The bus controller 222 reads the information out of the buffer 223 and transfers it to the cross bus 210, which transfers the information to the bus interchange apparatus connected to the system 1.

To transfer information from the system 1 to the system 0, the bus controller 222 receives the information from the cross bus 210 and writes it to the buffer 224. The bus controller 221 reads the information out of the buffer 224 and transfers it to the system bus 205. The buffers 223 and 224 are each a first-in first-out (FIFO) memory. The buffer 223 has a function of determining whether information read therefrom must be sent to the bus controller 222 or the register 225. The buffer 224 has a function of determining whether information read therefrom must be sent to the bus controller 221 or the register 225.

The register 225 stores fault information and repair information. Fault information is written into and read out of the register 225 through the buffers 223 and 224. The register 225 can be accessed from the system bus (205 or 215) and cross bus 210 to write and read fault information to and from the register 225.

FIG. 27 is a flowchart showing a fault process according to a prior art. Step C1 starts the fault process if an access is abnormally terminated. Step C2 accesses all I/O devices of an acting one of the systems 0 and 1. Step C3 checks to see if all accesses are abnormally terminated. If so, it is determined that the system bus of the acting system has a fault, and if not so, step C4 checks to see if an access to a specific I/O device of the acting system is abnormally terminated. If so, it is determined that the specific I/O device has a fault.

If not so, step C5 makes an access to the opposite bus interchange apparatus, and step C6 determines whether or not the access is abnormally terminated. If it is abnormally terminated, it is determined that the cross bus 210 has a fault, and if not, step C7 accesses all I/O devices of the standby system. Step C8 checks to see if all accesses are abnormally terminated. If so, it is determined that the system bus of the standby system has a fault, and if not so, step C9 checks to see if an access to a specific I/O device of the standby system is abnormally terminated. If so, it is determined that the specific I/O device has a fault, and if not so, it is determined that the abnormal access termination has been caused not by a fault but by congestion, and the fault process ends.

If the fault process finds a fault in one of the systems 0 and 1, it writes fault information into the register 225 of the bus interchange apparatus connected to the system in which the fault has been found so that the other system may read the contents of the register and recognize the fault in the opposite system. When the fault is corrected, repair information is prepared for the fault information.

According to the dual system of the prior art, fault information held by the register 225 of any one of the bus interchange apparatuses 204 and 214 is accessible only through one of the buffers 223 and 224 thereof. If the buffer 223 has no free space, an access request for the register 225 from the bus controller 221 is not written into the buffer 223, and therefore, the bus controller 221 is unable to access the register 225. If an access request for the register 225 is written into the buffer 223 and if data to be transferred cannot be read out of the buffer 223 due to a fault on the cross bus side, there will be no way to access the register 225. If the buffer 224 has no free space or if the contents of the buffer 224 cannot be read, the bus controller 222 is unable to access the register 225.

If the register 225 is inaccessible, fault information and repair information will not be written into and read out of the register 225. It is impossible for the prior art to locate a fault or carry out a reset operation to deal with the fault. As a result, the prior art must reset and restart the system as a whole by suspending services provided by the system.

Now, embodiments of the present invention will be described.

Figure 1:
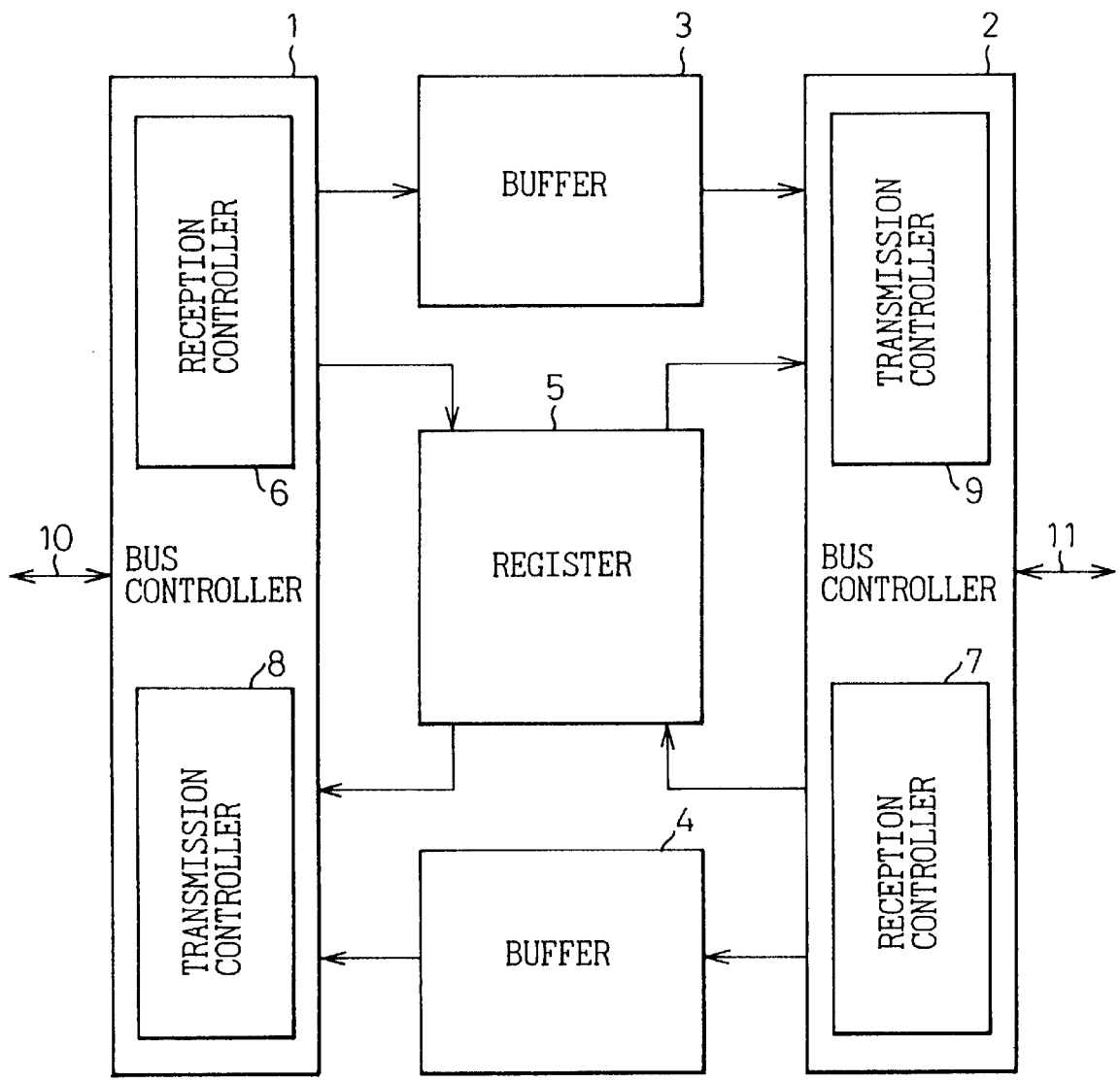
FIG. 1 shows essential parts of a bus interchange apparatus according to an embodiment of the present invention.

FIG. 1 shows essential parts of a bus interchange apparatus according to an embodiment of the present invention. The apparatus has first and second bus controllers 1 and 2, buffers 3 and 4, and a register 5. The bus controller 1 has a reception controller 6 and a transmission controller 8, and the bus controller 2 has a reception controller 7 and a transmission controller 9. The bus controller 1 is connected to a system bus 10, and the bus controller 2 is connected to a cross bus 11. The buffers 3 and 4 are each a FIFO memory for temporarily storing information transferred through the bus controllers 1 and 2. The register 5 is directly accessible from the bus controllers 1 and 2. The system bus 10 is any one of first and second system buses that constitute a dual system. These system buses are connected to each other through bus interchange apparatuses, one of which is shown in FIG. 1, and the cross bus 11.

Each of the reception controllers 6 and 7 is able to access the register 5 and writes, for example, fault information transmitted through the system bus 10 or the cross bus 11 into the register 5. Each of the transmission controllers 8 and 9 is able to access the register 5, read, for example, fault information out of the register 5, and transmit the information to the system bus 10 or the cross bus 11. Even if the buffers 3 and 4 are full, information can be written into or read out of the register 5. As a result, it will be easy to locate a fault and carry out a reset process only at the location. Namely, there is no need of resetting the system as a whole or suspending services provided by the system. It is easy to repair the fault.

Figure 2:
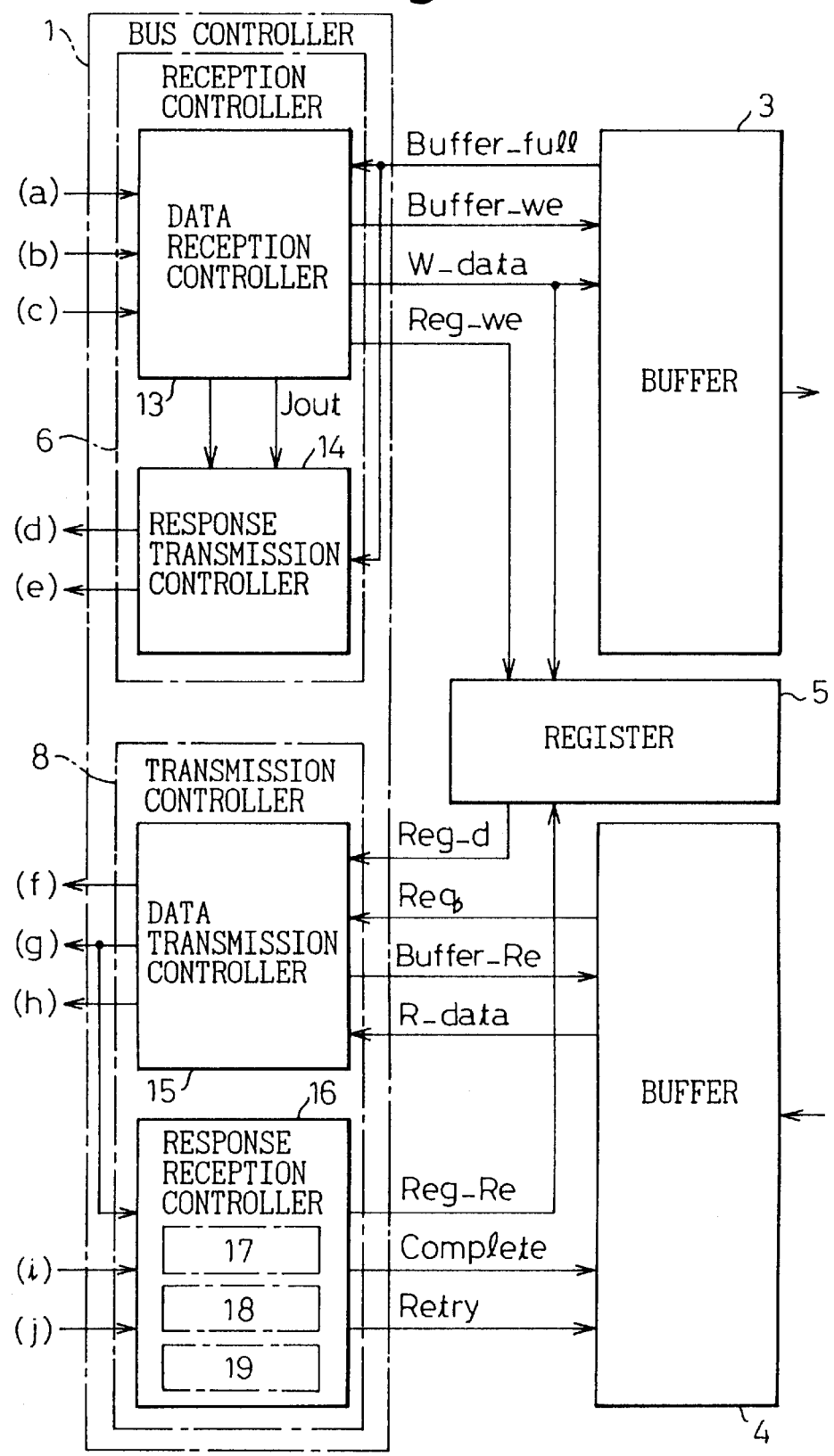
FIG. 2 shows a bus controller of the bus interchange apparatus of FIG. 1.

FIG. 2 shows the details of the bus controller 1 and relationships among the bus controller 1, buffers 3 and 4, and register 5. The reception controller 6 has a data reception controller 13 and a response transmission controller 14. The transmission controller 8 has a data transmission controller 15 and a response reception controller 16 consisting of first to third circuit parts 17 to 19.

The structure of the bus controller 2 and its relationships to the buffers 3 and 4 and register 5 are substantially the same as those of the bus controller 1. Namely, the reception controller 7 corresponds to the reception controller 6, and the transmission controller 9 corresponds to the transmission controller 8. The reception controller 7 and transmission controller 9 are able to directly access the register 5.

In FIG. 2, the bus controller 1 handles a command select signal "Cmds" (a), command effective signal "Cads" (b), data "CAD" (c) to be transferred, response signal "Response" (d), busy signal "Busy" (e), command select signal "Cmds" (f), command effective signal "Cads" (g), data "CAD" (h) to be transferred, response signal "Response" (i), and busy signal "Busy" (j). The reception controller 6 handles a buffer-full signal "Buffer_full" to indicate that the buffer 3 has no free space, a write enable signal "Buffer_we" for the buffer 3, write data "W_data" to be transferred, a write enable signal "Reg_we" for the register 5, and decision signal "Jout."

The transmission controller 8 handles data "Reg_d" read out of the register 5, request signal "Req," read enable signal "Buffer_re" for the buffer 4, data "R_data" read out of the buffer 4 and to be transferred, read enable signal "Reg_Re" for the register 5, completion signal "Complete," and retry signal "Retry." The write enable signal "Reg_we" enables the write data "W_data" such as fault information to be written into the register 5. The read enable signal "Reg_Re" enables the data "Reg_d" such as fault information to be read out of the register 5. In this way, the bus controller 1 is able to directly access the register 5 by bypassing the buffers 3 and 4.

Figure 3:
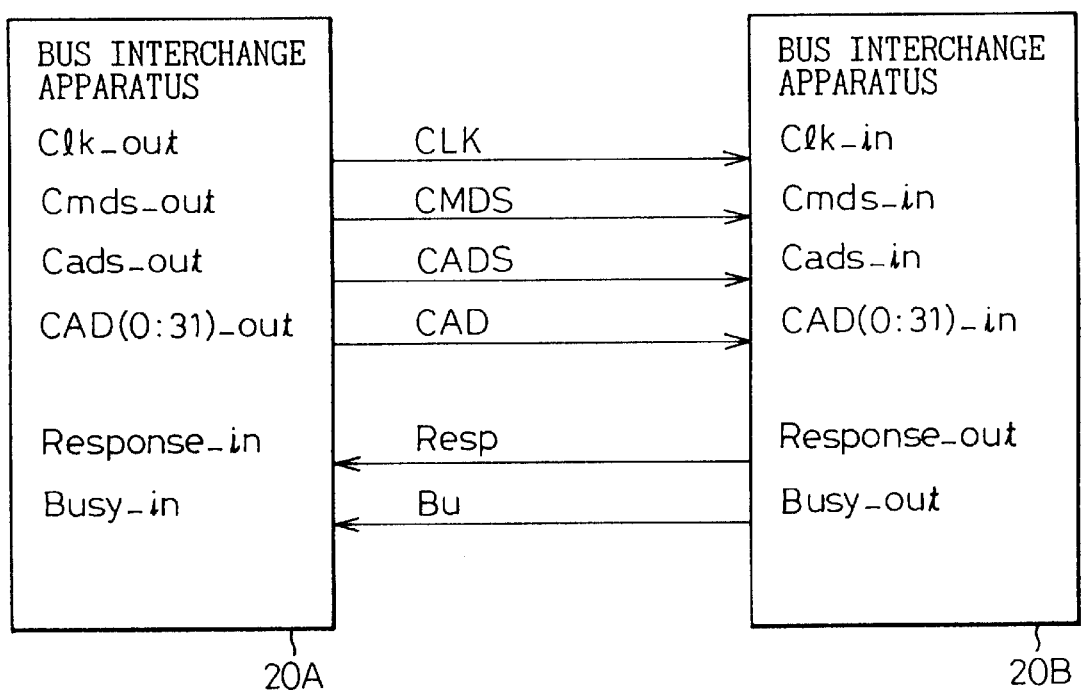
FIG. 3 shows information transmitted through bus interchange apparatuses.

FIG. 3 shows bus interchange apparatuses of a dual system composed of systems 0 and 1. In this example, information is transferred from the apparatus 20A of the system 0 to the apparatus 20B of the system 1 through a cross bus. The information includes a clock signal "CLK," command select signal "CMDS," command effective signal "CADS," information "CAD" including a command C, an address A, and data D, response signal "Resp," and busy signal "Bu."

The apparatus 20A transmits a clock signal "Clk_out," a command select signal "Cmds_out," command effective signal "Cads_out," and information "CAD(0:31)_out" to the cross bus and receives a response signal "Response_in" and busy signal "Busy_in" from the cross bus. The apparatus 20B receives a clock signal "Clk_in," command select signal "Cmds_in," command effective signal "Cads in," and information "CAD(0:31)_in" from the cross bus and transmits a response signal "Response_out" and busy signal "Busy_out" to the cross bus. Here, the information "CAD (0:31)" consists of bits 0 to 31 representing a command, an address, and data.

FIGS. 4 and 5 show a transfer operation between the bus interchange apparatuses 20A and 20B of FIG. 3. In FIG. 4, the apparatus 20A transmits the command select signal "CMDS," command effective signal "CADS," and information "CAD" composed of a command C, an address A, and data D to the cross bus in synchronization with the signal "CLK." While the information "CAD" is being transmitted, the signal "CADS" is asserted. In response to the information "CAD," the apparatus 20B transmits the response signal "Resp" after 1.5 periods of the signal "CLK." At this time, the busy signal "Bu" is 0. This means that the apparatus 20B has received the information "CAD."

In FIG. 5, the apparatus 20A transmits the signal "CLK," command select signal "CMDS," command effective signal "CADS," and information "CAD" to the apparatus 20B, similar to FIG. 4. After 1.5 periods of the signal "CLK," the apparatus 20B sends the response signal "Resp" and the busy signal "Bu" to indicate that the buffer of the apparatus 20B has no free space. This means that the apparatus 20B is unable to receive the information "CAD." This leads to an abnormal termination.

FIG. 6A shows IDs assigned to components of a dual system consisting of systems 0 and 1. In the system 0, ID=00 is assigned to a processor 21, ID=01 to an I/O device 22, and ID=02 to a bus interchange apparatus 24. In the system 1, ID=10 is assigned to a processor 31, ID=11 to an I/O device 32, and ID=12 to a bus interchange apparatus 34. Similarly, IDs are assigned to other I/O devices and memories of the dual system. The dual system includes system buses 23 and 33 and a cross bus 30.

FIG. 6B shows a header of a command field of information "CAD" to be transferred between the systems 0 and 1. The information "CAD" is composed of a command C, an address A, and data D. The information "CAD" may be a packet. The header consists of a sender ID field SID, a receiver ID field RID, a reserved field RSV, and a field "oa" that is "1" when transferring an order and "0" when transferring an answer.

When the processor 21 of the system 0 transfers a command to the I/O device 32 of the system 1, the header contains SID=00, RID=11, and oa=1 to indicate order transfer. In response to this, the I/O device 32 sends an answer with SID=11, RID=00, and oa=0. When the processor 21 transfers a command such as a register read command to the bus interchange apparatus 34, the header contains SID=00, RID=12, and oa=1 to indicate order transfer. In response to this, the apparatus 34 sends an answer with SID=12, RID=00, and oa=0.

FIG. 7 shows essential parts of the data reception controller 13 of FIG. 2. The controller 13 has flip-flops (FFs) 41 to 43 and 47 to 49, an ID unit 44, and gate circuits 45 and 46.

The controller 13 receives the command select signal "Cmds_in" (a), command effective signal "Cads_in" (b), and data "CAD(0:31)_in" (c), as well as the buffer-full signal "Buffer_full" from the buffer 3. The flip-flops 41 to 43 provide output signals "Cmsd_f," "Cads_f," and "CAD_f," respectively.

The ID unit 44 checks to see if a receiver ID in the field RID (FIG. 6) indicates the register 5. The ID unit 44 provides the decision signal "Jout" to the response transmission controller 14 and gate circuits 45 and 46. If the receiver ID indicates the register 5, the signal "Jout" is "1." If the command effective signal "Cads_f" is "1," an AND output signal from the gate circuit 45 is "1" so that the flip-flop 47 applies the write enable signal "Reg_we" to the register 5. As a result, write data "W_data" such as fault information from the flip-flop 49 is written into the register 5. At this time, the decision signal "Jout" of "1" serves as a prohibition signal to close the gate circuit 46.

If the decision signal "Jout" is "0," data is not written into the register 5 but is transferred to the cross bus. If the buffer-full signal "Buffer_full" is "0," the buffer 3 has a free space. When the command effective signal "Cads_f" is "1," the gate circuit 46 provides an output signal of "1" because the prohibition signal, i.e., the decision signal "Jout" is "0." As a result, the flip-flop 48 supplies the write enable signal "Buffer_we" to the buffer 3, and the write data "W_data" from the flip-flop 49 is written into the buffer 3. In other cases, the write enable signal "Buffer_we" is not provided so that no data is written into the buffer 3. In this way, one of the buffer and register is selected and data is written into the selected one.

FIG. 8 shows essential parts of the ID unit 44 of FIG. 7. The ID unit 44 has a coincidence unit 51, a selector (SEL) 52, an ID register 53, and a flip-flop 54. The ID register 53 holds an ID assigned to the register 5. The coincidence unit 51 receives the ID from the ID register 53 and the receiver ID held in the field RID (FIG. 6) of the header of data "CAD_f" from the flip-flop 43 (FIG. 7).

If the IDs agree with each other, the coincidence unit 51 provides an output signal "cmp" of "1," and if not, of "0." The selector 52 has a terminal S to receive the command select signal "Cmds_f" from the flip-flop 41 (FIG. 7). According to the signal "Cmds_f," the selector 52 selects one of signals applied to terminals A and B thereof. If the signal "Cmds_f" is "1," the selector 52 selects the terminal A, and if it is "0," the terminal B. The selector 52 provides the decision signal "Jout," which is held in the flip-flop 54 and is supplied to the terminal B of the selector 52.

FIG. 9 shows essential parts of the response transmission controller 14 of FIG. 2. The controller 14 has a gate circuit 55 and flip-flops 56 and 57. The controller 14 receives the command effective signal "Cads_f" from the data reception controller 13, the decision signal "Jout" from the selector 52, and the buffer-full signal "Buffer_full." According to the signal "Cads_f," the controller 14 provides a response signal "Response_out" ((d) of FIG. 2) through the flip-flop 56.

If "Cads_f"=1, "Jout"=0, and "Buffer_full"=1, the gate circuit 55 provides "1" so that the flip-flop 57 provides a busy signal "Busy_out" ((e) of FIG. 2) of "1." If "Jout" =1 to indicate an access to the register 5, or if "Buffer_full"=0 to indicate that the buffer 3 has a free space, the gate circuit 55 provides "0" so that the flip-flop 57 provides a busy signal "Busy_out" of "0."

Figure 10:
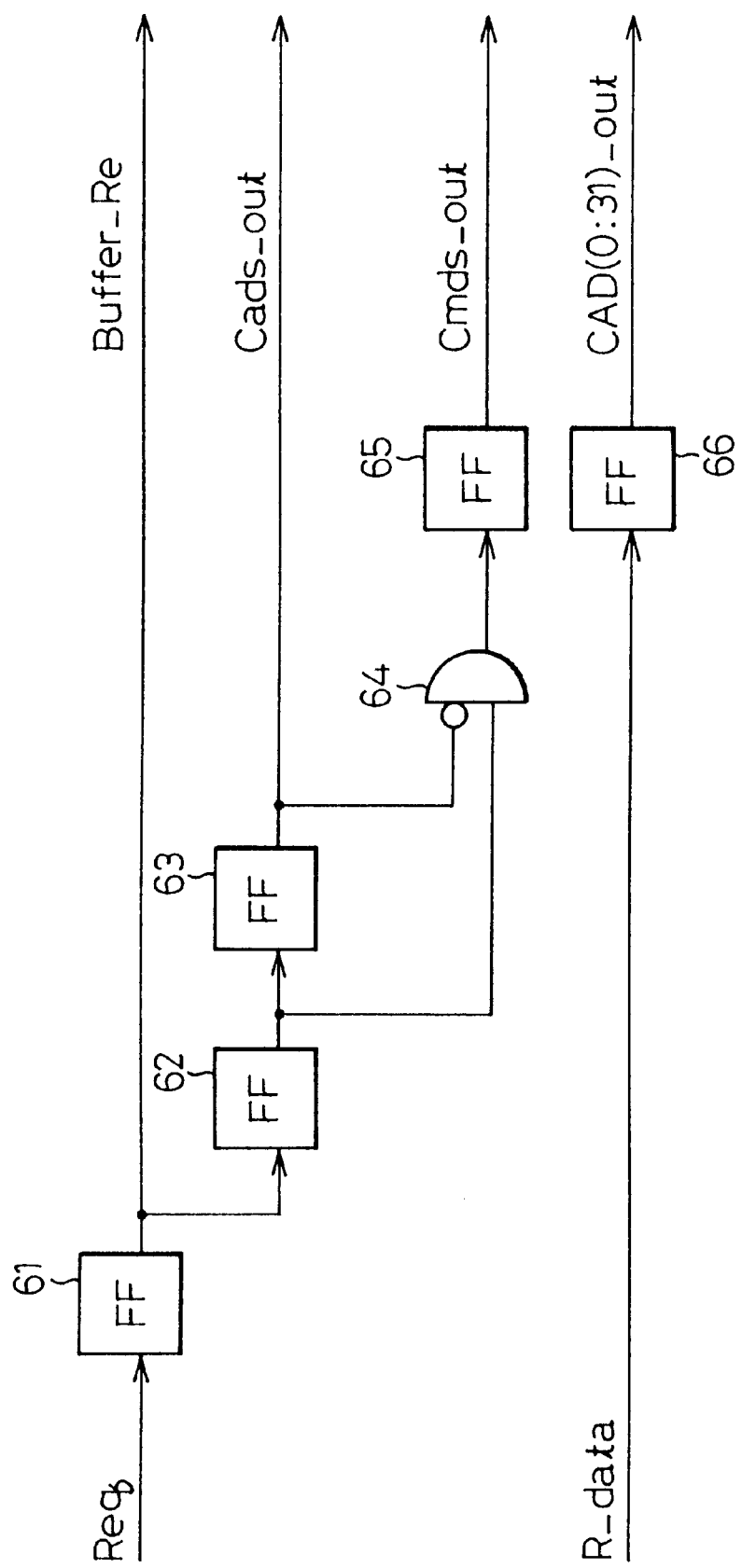
FIG. 10 shows a data transmission controller of the bus controller of FIG. 2.

FIG. 10 shows essential parts of the data transmission controller 15 of FIG. 2. The controller 15 has flip-flops 61 to 63, 65, and 66 and a gate circuit 64. The flip-flop 61 receives a request signal "Req" from the buffer 4 (FIG. 2), and the flip-flop 66 receives data "R_data" read out of the buffer 4.

The flip-flop 61 supplies the read enable signal "Buffer_re" to the buffer 4, and the flip-flops 62 and 63 supply a command effective signal Cads_out two clock periods behind the read enable signal "Buffer_re." When the output of the flip-flop 62 rises to "1," the output of the gate circuit 64 becomes "1" so that the flip-flop 65 may provide a command select signal "Cmds_out."

Data "R_data" read out of the buffer 4 is passed through the flip-flop 66 as data "CAD(0:31)_out" to be transferred. Although a structure for data "Reg_d" read out of the register 5 is not shown, it may be provided from the flip-flop 66 like the data "R_data" read out of the buffer 4.

Figure 11:
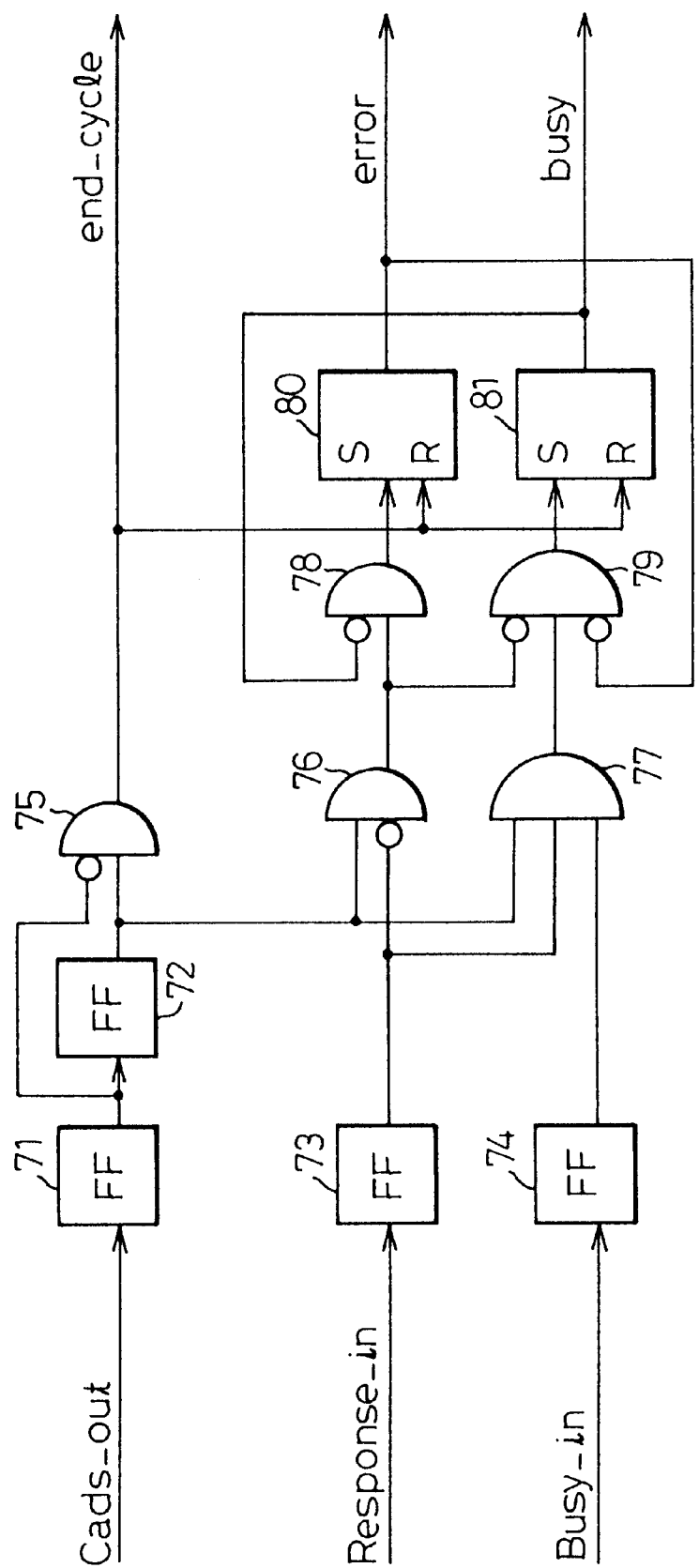
FIG. 11 shows a first circuit part of a response reception controller of the bus controller of FIG. 2.

FIG. 11 shows essential parts of the first circuit part 17 of the response reception controller 16 of FIG. 2. The first circuit part 17 has flip-flops 71 to 74, gate circuits 75 to 79, and flip-flops 80 and 81.

The flip-flop 71 receives the command effective signal "Cads_out" from the flip-flop 63 of FIG. 10, the flip-flop 73 receives the response signal "Response_in" from the system or cross bus, and the flip-flop 74 receives the busy signal "Busy_in" from the system or cross bus. The command effective signal "Cads_out" maintains "1" for a period that corresponds to the length of data transferred. As a result, an AND of an inverted signal of the output of the flip-flop 71 and the output of the flip-flop 72 changes an end cycle signal "end_cycle" from the gate circuit 75 to "1" to reset the flip-flops 80 and 81.

While the output of the flip-flop 72 is "1," the output of the flip-flop 73 becomes "1" according to the response signal "Response_in," and the output of the flip-flop 74 becomes "1" according to the busy signal "Busy_in." Then, an AND signal from the gate circuit 77 becomes "1." if an error signal from the flip-flop 80 is "0," the output of the gate circuit 79 becomes "1" to reset the flip-flop 81, which provides a busy signal of "1."

If the response signal "Response_in" is "0," the output of the gate circuit 76 is "1." If the signal "busy" from the flip-flop 81 is "0," the output of the gate circuit 78 becomes "1" to reset the flip-flop 80, which then generates an error signal of "1" to notice an error occurrence. Namely, the error signal is issued if the response signal "Response_in" is not received within a period starting two cycles after the reception of the command effective signal "Cads_out" and ending when the signal "end_cycle" becomes "1."

Figure 12:
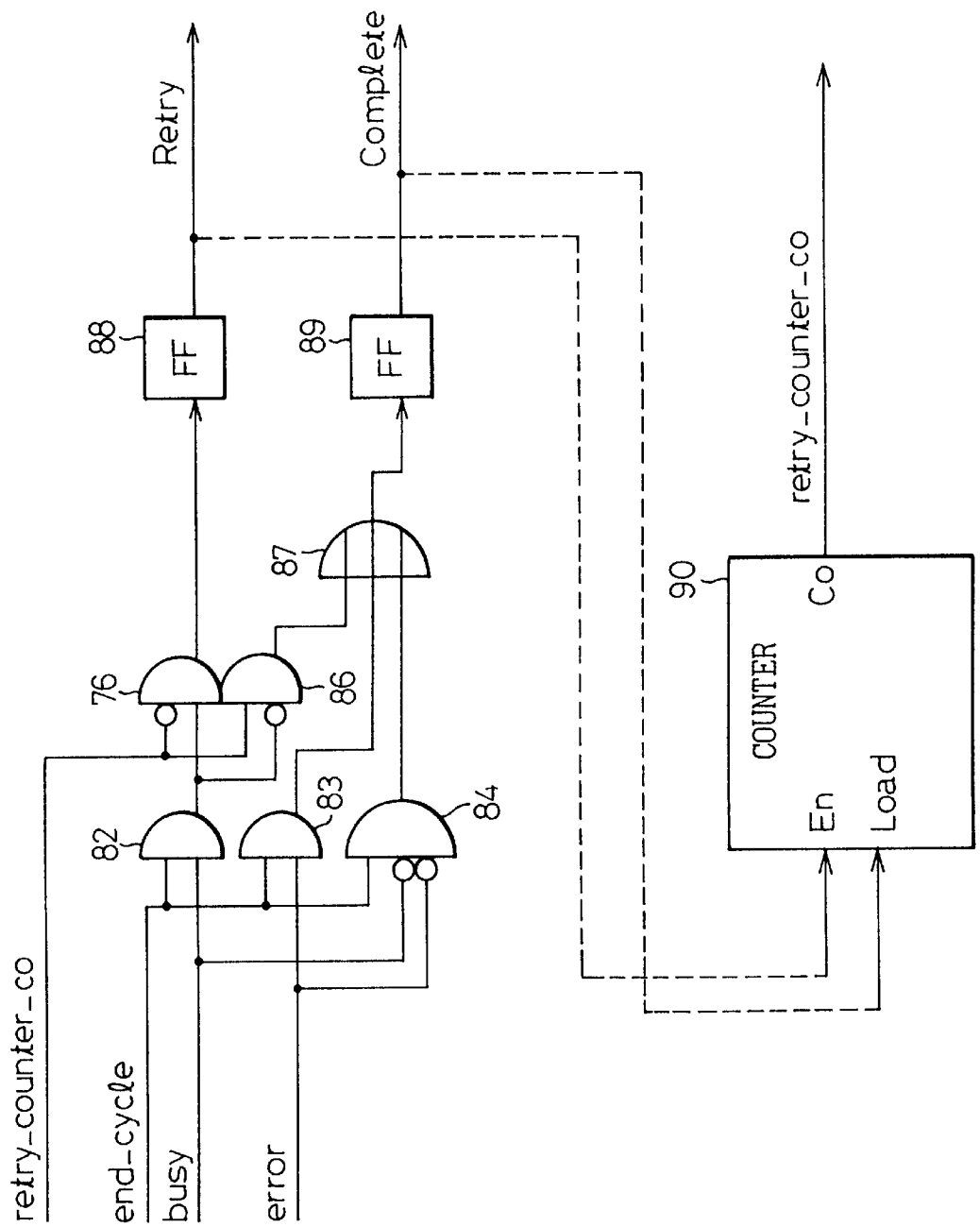
FIG. 12 shows second and third circuit parts of the response reception controller of FIG. 2.

FIG. 12 shows essential parts of the second circuit part 18 and third circuit part 19 of FIG. 2. The second circuit part 18 has gate circuits 82 to 87 and flip-flops 88 and 89, and the third circuit part 19 has a counter 90.

The second circuit part 18 receives the signal "end_cycle" from the gate circuit 75 (FIG. 11), the signal "busy" from the flip-flop 81 (FIG. 11), the error signal from the flip-flop 80 (FIG. 11), and a carry-out signal "retry_counter_co" that is based on the number of retry operations counted by the counter 90.

If the signal "end_cycle" is "1" and the signal "busy" and error signal are both "0," the gate circuit 84 provides an output signal of "1." As a result, the flip-flop 89 provides a completion signal "Complete" of "1." At this time, the output of the gate circuit 85 is "0," and therefore, the retry signal "Retry" is "0" to indicate a normal completion.

If the signal "end_cycle" is "1" and the signal "busy" is also "1," the output of the gate circuit 82 is "1." When the signal "retry_counter_co" is "0," the output of the gate circuit 85 is "1" so that the flip-flop 88 provides a retry signal of "1." The retry signal is applied to the buffer 4, which provides a request signal "Req" to the data transmission controller 15. As a result, the data transmission controller 15 tries again to read the buffer 4. The counter 90 receives the retry signal at a terminal En to increment the count.

The counter 90 counts the retry signal to indicate the number of retry operations. In response to the signal "Complete" indicating a normal completion, the counter 90 loads an initial value or clears the count, and if the count exceeds a retry limit, provides the signal "retry_counter_co," which is supplied to the gate circuits 85 and 86. Here, the retry limit may be 255 if the counter is an 8-bit counter. The signal "retry_counter_co" closes the gate circuit 85 so that no retry signal is provided even if the signal "busy" is received. Instead, the signal "Complete" is provided. Namely, once the retry operation is repeated up to the retry limit, no further retry operation is carried out and an abnormal completion is established.

Figure 13:
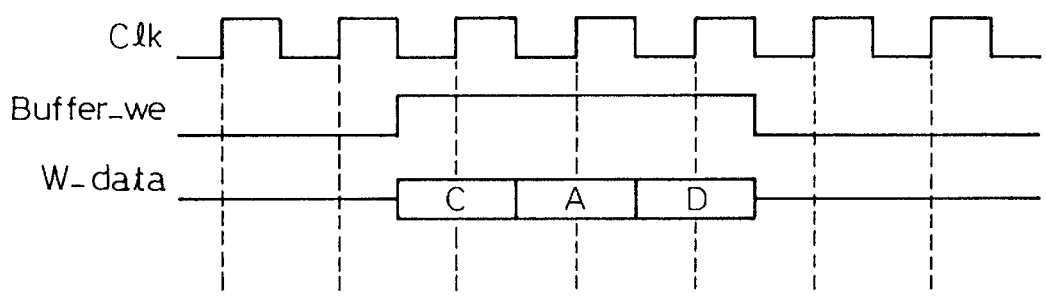
FIG. 13 shows the buffer write timing of the bus controller of FIG. 2.

FIG. 13 shows the timing of the clock signal "Clk," write enable signal "Buffer_we," and write data "W_data" to be written into the buffer 3 according to the present invention. The data "W_data" contains a command C, an address A, and data D and is transferred from the data reception controller 13 to the buffer 3 (FIG. 2). In response to the write enable signal "Buffer_we," the data "W_data" is written into the buffer 3 when the signal "Clk" rises. The signal "Clk" has pulses and a speed corresponding to the bit structure of the write data "W_data." In FIG. 13, the signal "Clk" is depicted simply.

Figure 14:
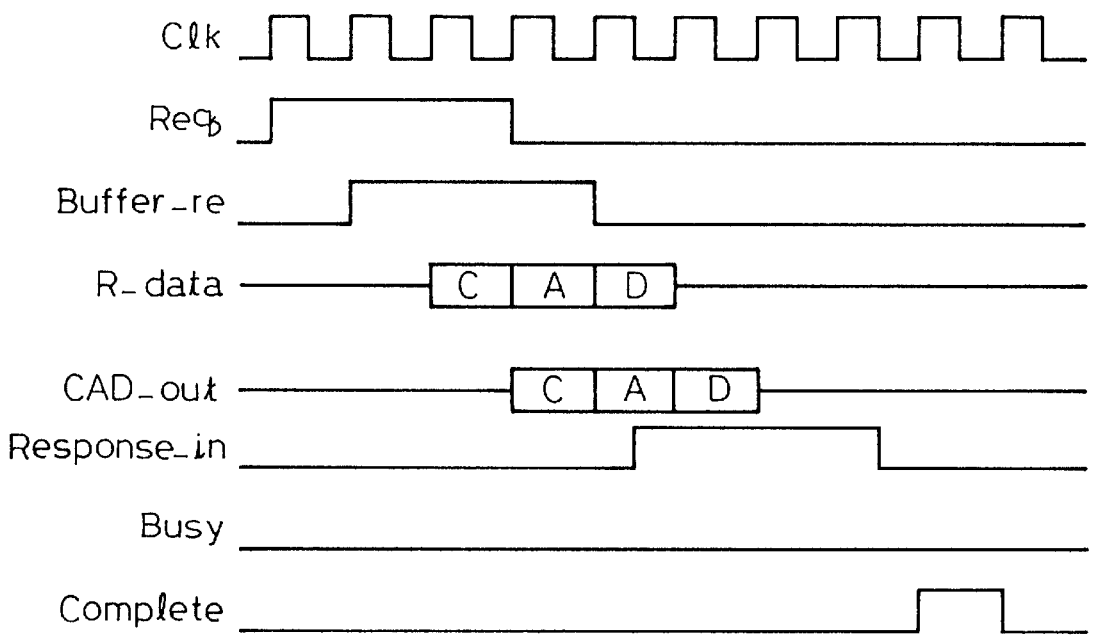
FIGS. 14 and 15 show the buffer read timing of the bus controller of FIG. 2.

FIG. 14 shows the timing of the signals "Clk," "Req," "Buffer_re," "Response_in," "Busy," and "Complete" to read data "R_data" out of the buffer 4 and send it as "CAD_out." These signals are transferred among the data transmission controller 15, response reception controller 16, and buffer 4 of FIG. 2.

The request signal "Req" is supplied to the flip-flop 61 (FIG. 10), which provides the read enable signal "Buffer_re" to the buffer 4 after a period of the signal "Clk." In response to the signal "Buffer_re," the data "R_data" read out of the buffer 4 is supplied to the flip-flop 66 (FIG. 10), which prepares the data "CAD_out" to be transmitted from the data transmission controller 15 after a period of the signal "Clk." In response to the data "CAD_out," the response signal "Response_in" is supplied to the response reception controller 16, which transmits the signal "Complete" to the buffer 4. Here, the busy signal "Busy" is "0."

Figure 15:
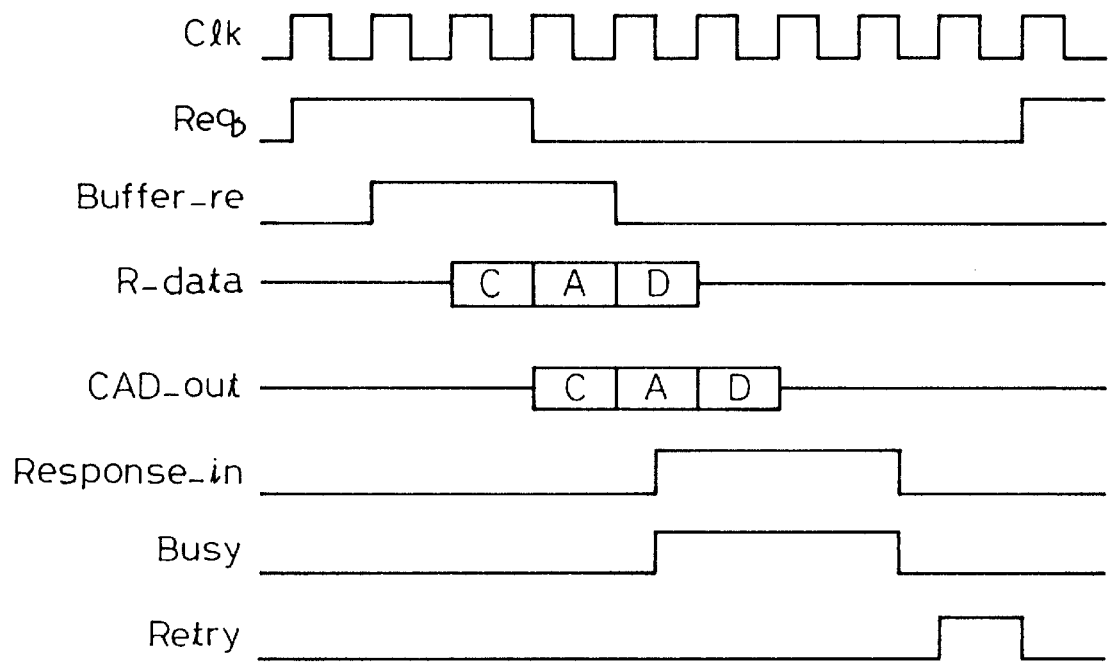

FIG. 15 shows the timing of the signals shown in FIG. 14 when an abnormal termination occurs. The response reception controller 16 receives the busy signal "Busy" of "1" together with the response signal "Response_in." Instead of the signal "Complete" of FIG. 14, the retry signal "Retry" is sent from the flip-flop 88 (FIG. 12) to the buffer 4.

Figure 16:
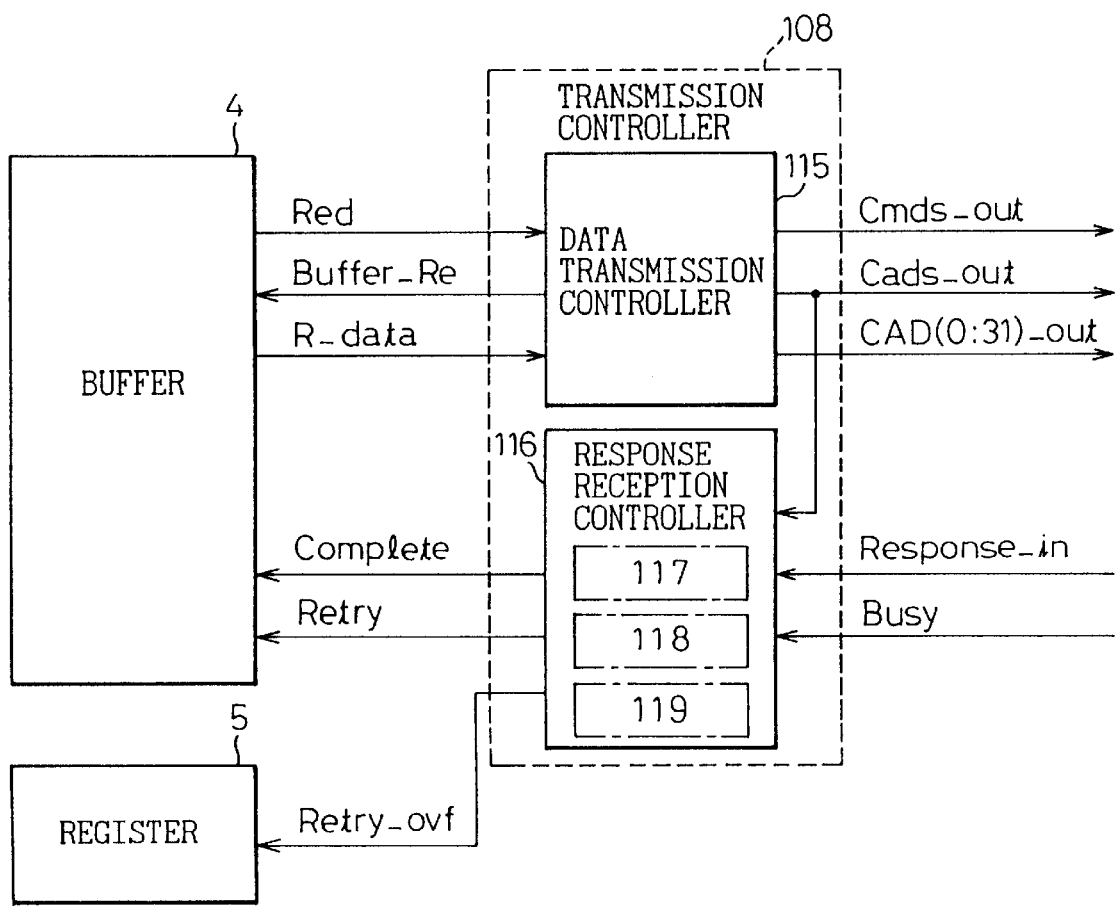
FIG. 16 shows a transmission controller according to another embodiment of the present invention.

FIG. 16 shows a transmission controller 108 according to another embodiment of the present invention. The transmission controller 108 has a data transmission controller 115 and a response reception controller 116 that has first to third circuit parts 117 to 119. The transmission controller 108 involves a buffer 4 and a register 5. Relationships among the transmission controller 108, buffer 4, and register 5 correspond to those among the transmission controller 8, buffer 4, and register 5 of FIG. 2. The transmission controller 108 writes a retry-over signal "Retry_ovf" to the register 5 if the number of retry operations exceeds a retry limit and if a busy response is received. Signals shown in FIG. 16 are the same as those of FIG. 2.

Figure 17:
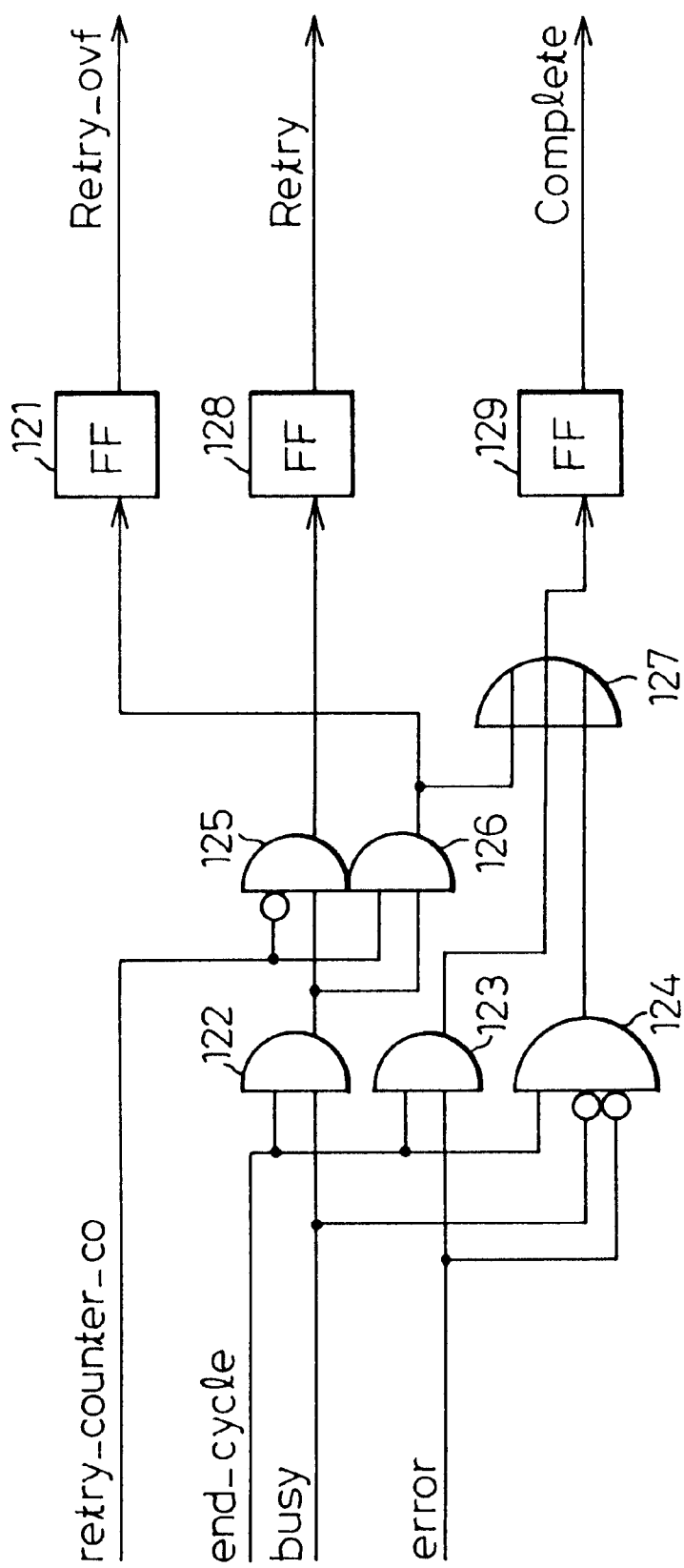
FIG. 17 shows a second circuit part of the transmission controller of FIG. 16.

FIG. 17 shows the second circuit part 118 of the response reception controller 116 of FIG. 16. The second circuit part 118 has gate circuits 122 to 127 and flip-flops 121, 128, and 129. Namely, the second circuit part 118 has the flip-flop 121 in addition to the arrangement of FIG. 12. The first circuit part 117 and third circuit part 119 of FIG. 16 may have the same structures as those of FIGS. 11 and 12.

The number of retry operations is counted. If the count exceeds the retry limit and if a carry-out signal "retry_counter_co," end cycle signal "end_cycle," and busy signal "busy" are each "1," the gate circuits 122 and 126 that are AND circuits provide each "1" and the gate circuit 127 that is an OR circuit provides "1." As a result, the flip-flop 129 provides a completion signal "Complete," and the flip-flop 121 provides the retry-over signal "Retry_ovf," which is stored as fault information in the register 5 as shown in FIG. 16.

The signal "Complete" from the flip-flop 129 is provided in response to the signal "end_cycle." Namely, the signal "Complete" is provided if the signal "end_cycle" is "1," the signal "busy" is "1," or the error signal is "1," or the busy and error signals are each "0," or the carry-out signal "retry_counter_co," end cycle signal "end_cycle," and signal "busy" are each "1."

Figure 18:
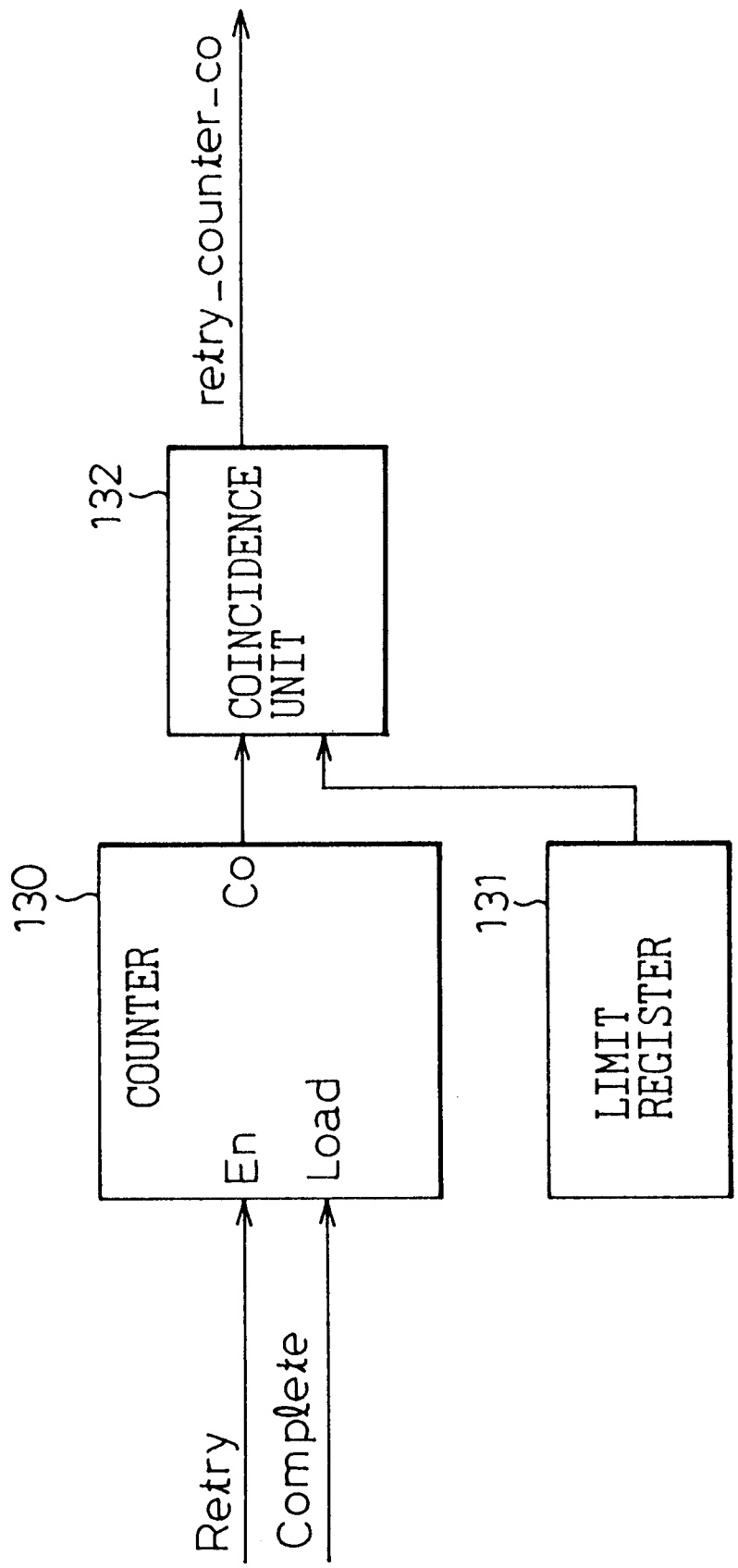
FIG. 18 shows a third circuit part of the transmission controller of FIG. 16.

FIG. 18 shows essential parts of the third circuit part 119 of FIG. 16. The third circuit part 119 has a counter 130, a limit register 131, and a coincidence unit 132. The limit register 131 and coincidence unit 132 are additional to the third circuit part of FIG. 12.

A retry limit is set in the limit register 131. The coincidence unit 132 compares the retry limit held in the register 131 with the number of retry operations counted by the counter 130. If they agree with each other, the coincidence unit 132 provides a carry-out signal "retry_counter_co." Without changing the structure of the counter 130, an optional retry limit can be set in the limit register 131. The counter 130 loads an initial value in response to a normal completion signal "Complete." The third circuit part 119 may be combined with the first and second circuit parts of FIGS. 11 and 12 to form a response reception controller.

Figure 19:
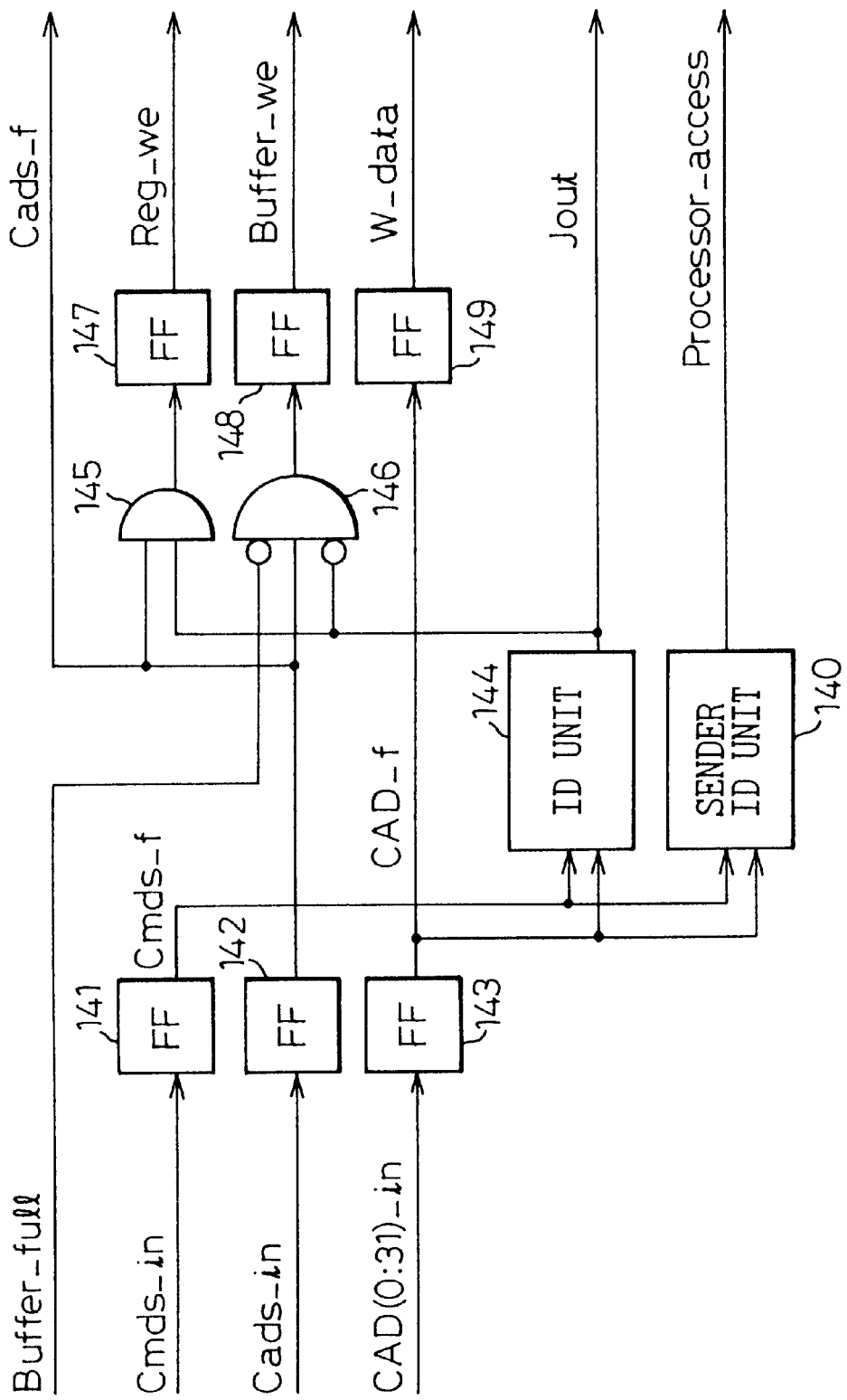
FIG. 19 shows a data reception controller according to still another embodiment of the present invention.

FIG. 19 shows a data reception controller according to still another embodiment of the present invention. The data reception controller has a sender ID unit 140, flip-flops 141 to 143 and 147 to 149, an ID unit 144, and gate circuits 145 and 146. The sender ID unit 140 identifies a sender that has made a transfer request and is additional to the data reception controller of FIG. 7. The flip-flops and gate circuits of FIG. 19 correspond to those of FIG. 7 having the same lower two digits in the reference numerals, and therefore, they will not be explained again.

According to a command select signal "Cmsd_f" from the flip-flop 141 and data "CAD_f" from the flip-flop 143, the sender ID unit 140 extracts a sender ID from the SID field of a header (FIG. 6), identifies the sender, and provides a decision signal "Processor_access."

Figure 20:
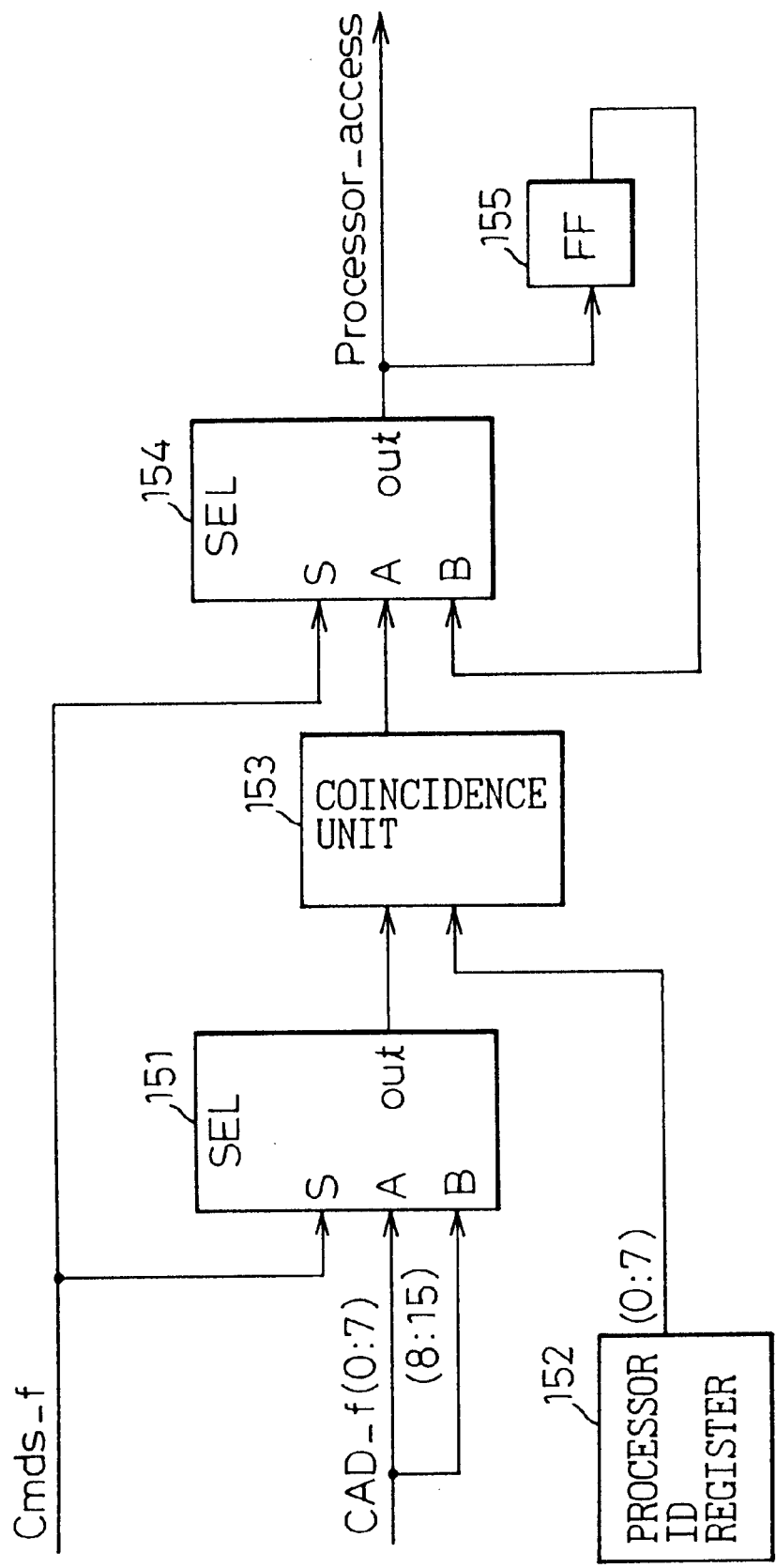
FIG. 20 shows a sender ID unit of the data reception controller of FIG. 19.

FIG. 20 shows essential parts of the sender ID unit 140 of FIG. 19. The unit 140 has selectors 151 and 154, a processor ID register 152, a coincidence unit 153, and a flip-flop 155.

The unit 140 determines whether or not a processor is a sender of an access request. The processor ID register 152 stores the ID of a processor to be detected. For example, to identify the processor 21 of FIG. 6, ID=00 is set in the processor ID register 152.

A command select signal "Cmds_f" from the flip-flop 141 (FIG. 19) is supplied to a terminal S of the selector 151. Data "CAD_f(0:7)" (a sender ID composed of bits 0 to 7 of a header) from the flip-flop 143 (FIG. 19) is supplied to a terminal A of the selector 151. Data "CAD_f(8:15)" (a receiver ID composed of bits 8 to 15 of the header) is supplied to a terminal B of the selector 151. In the case of order transfer, the selectors 151 and 154 select each the terminal A, and in the case of answer transfer, the selectors 151 and 153 select each the terminal B.

The coincidence unit 153 compares the sender ID for order transfer with the processor ID held in register 152 and provides a coincidence signal to a terminal A of the selector 154. The coincidence unit 153 compares the sender ID for answer transfer with the processor ID held in the register 152 and provides a coincidence signal to the terminal A of the selector 154.

The selector 154 provides a coincidence signal of "1" for order transfer as the signal "Processor_access" to the flip-flop 155. An output signal of "1" from the flip-flop 155 is supplied to a terminal B of the selector 154. For the answer transfer that follows, the signal "Processor_access" of "1" is also provided. If a sender ID of the next order transfer disagrees with the processor ID held in the register 152, the signal "Processor_access" is not provided and the flip-flop 155 is cleared. The register 152 may hold an ID assigned to an optional part to be detected.

Figure 21:
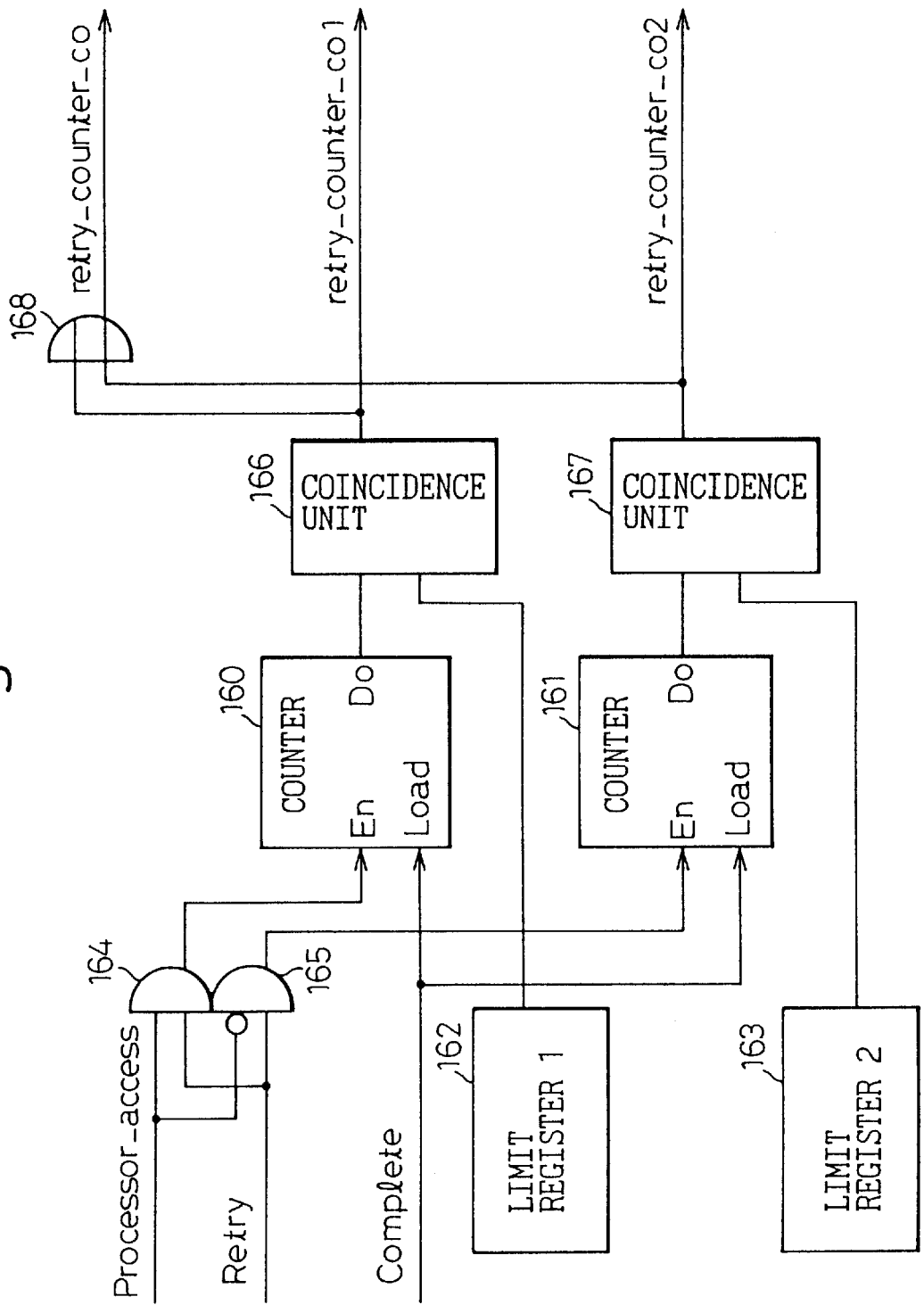
FIG. 21 shows a third circuit part of a response reception controller according to still another embodiment of the present invention.

FIG. 21 shows a third circuit part of a response reception controller according to still another embodiment of the present invention. This circuit corresponds to the third circuit part 19 of FIG. 2 and the third circuit part 119 of FIG. 16. The third circuit part of FIG. 21 has counters 160 and 161, limit registers 162 and 163, gate circuits 164 and 165, coincidence units 166 and 167, and a gate circuit 168.

The third circuit part of FIG. 21 receives a processor access decision signal "Processor_access," retry signal "Retry," and completion signal "Complete." If the signal "Processor_access" is "1," the retry signal "Retry" is passed through the gate circuit 164 and is applied to a terminal En of the counter 160 to increment the count thereof. If the access source is not a processor, the retry signal "Retry" is passed through the gate circuit 165 and is applied to a terminal En of the counter 161 to increment the count thereof.

The limit register 162 holds a retry limit for a processor access, and the limit register 163 holds a retry limit for an access other than the processor access. The coincidence unit 166 compares the count of the counter 160 with the retry limit held in the register 162. If they agree with each other, the coincidence unit 166 provides a carry-out signal "retry_counter_co1" of "1." The coincidence unit 167 compares the count of the counter 161 with the retry limit held in the register 163, and if they agree with each other, provides a carry-out signal "retry_counter_co2" of "1." In each case, the gate circuit 168 provides a carry-out signal "retry_counter_co."

The retry limits for processor access and other accesses are optional. If a count exceeds a corresponding one of the retry limits, an abnormal termination is reported. Information about the abnormal termination is written into the register 5 (FIG. 2). The number of sources whose accesses are going to be counted may be increased. In this case, a counter for counting the number of retry operations, a register for holding a retry limit, and a coincidence unit may be arranged for each source.

Figure 22:
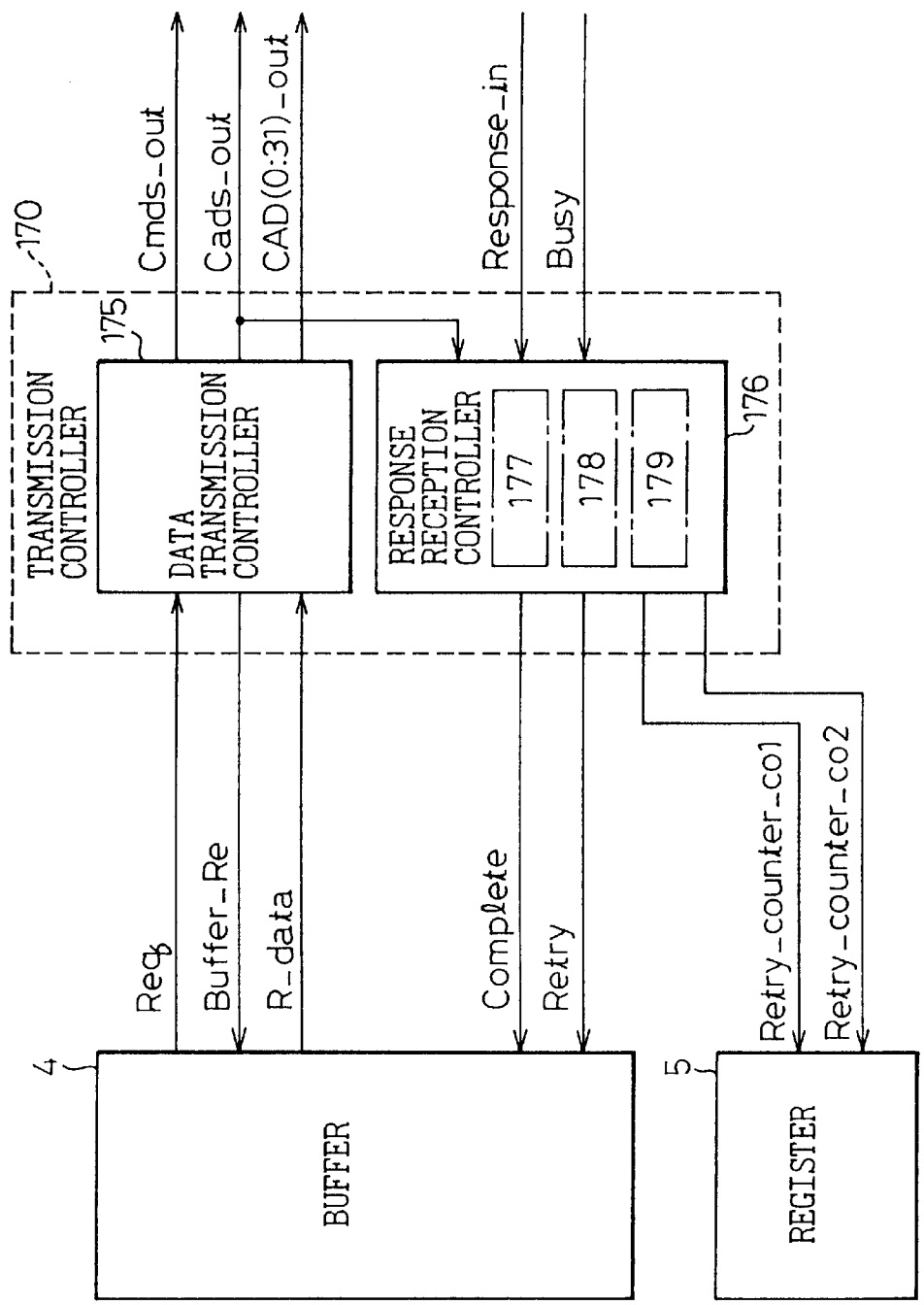
FIG. 22 shows a transmission controller according to still another embodiment of the present invention.

FIG. 22 shows a transmission controller according to still another embodiment of the present invention. The transmission controller 170 has a data transmission controller 175 and a response reception controller 176 that has first to third circuit parts 177 to 179. The transmission controller 170 involves a buffer 4 and a register 5. The third circuit part 179 has the structure of FIG. 21. A carry-out signal "Retry_counter_co1" to indicate a processor access and a carry-out signal "Retry_counter_co2" to indicate an access other than a processor access are written as fault information into the register 5. The first and second circuit parts 177 and 178 may be those of the preceding embodiments. The same signals as those of FIGS. 2 and 16 operate similarly in FIG. 22, and therefore, will not be explained again.

Figure 23:
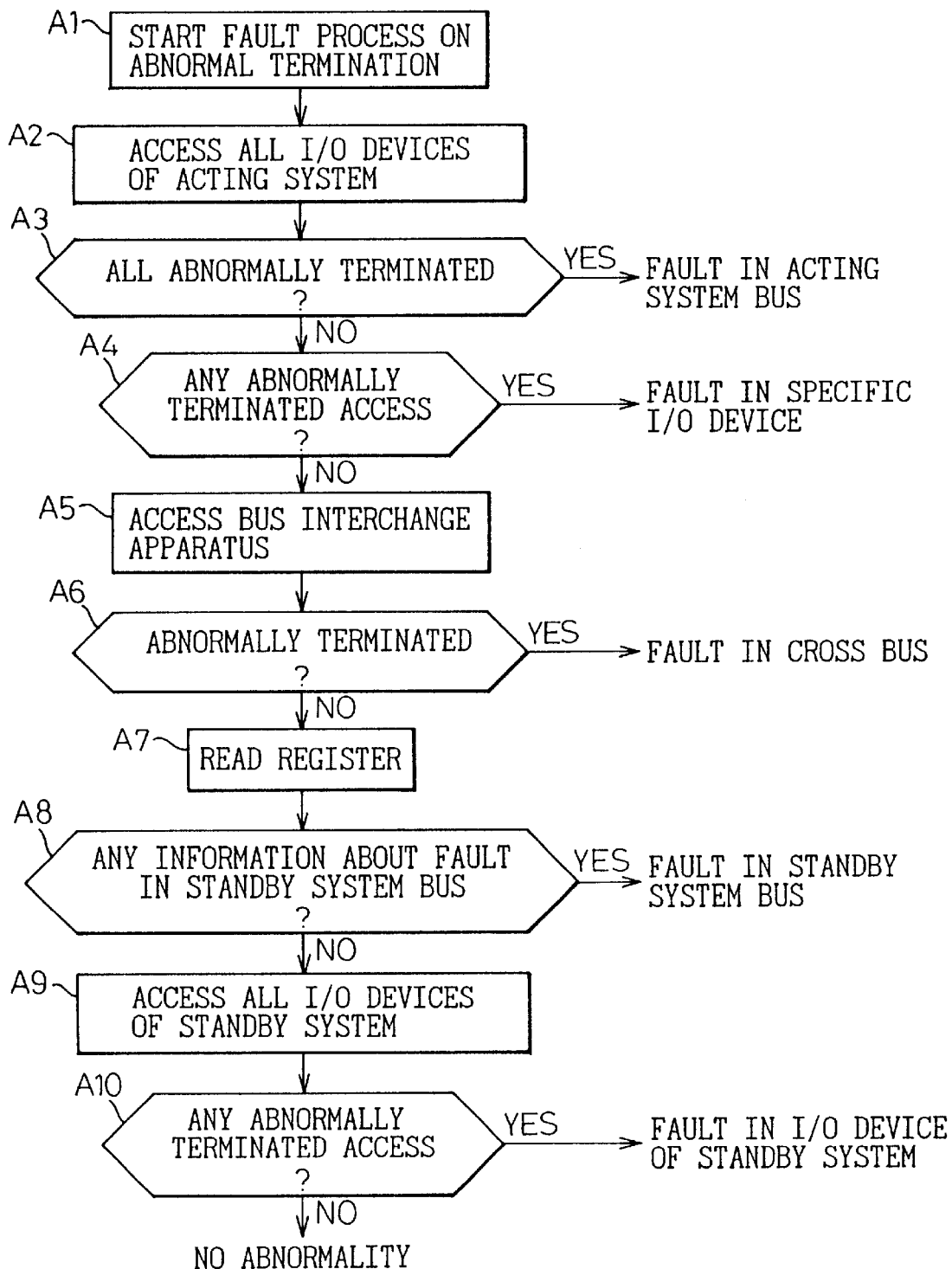
FIG. 23 is a flowchart showing a fault process according to the present invention.

FIG. 23 is a flowchart showing a fault process according to the present invention. The fault process is carried out in a dual system composed of systems 0 and 1 and the bus interchange apparatus of the present invention of FIG. 2. Step A1 starts the fault process in response to an abnormal access termination. Step A2 accesses all I/O devices of an acting one of the systems 0 and 1. Step A3 checks to see if all accesses are abnormally terminated. If so, it is determined that the system bus of the acting system has a fault, and fault information is written into the register 5 of the bus interchange apparatus. A standby one of the systems 0 and 1 may read the contents of the register 5 and recognize the fault of the acting system. If not all accesses are abnormal in step A3, step A4 checks to see if an access to a specific I/O device of the acting system is abnormally terminated. If so, it is determined that the specific I/O device has a fault.

If not, step A5 makes an access the opposite bus interchange apparatus, and step A6 checks to see if the access is abnormally terminated. If it is abnormally terminated, it is determined that the cross bus has a fault, and if not, step A7 searches the register 5 of the opposite bus interchange apparatus for fault information. Namely, in the opposite bus interchange apparatus, the response reception controller 16 (FIG. 2) applies the read enable signal "Reg_Re" to the register 5 and reads the same.

Step A8 checks to see if the data "Reg_d" read out of the register 5 contains fault information indicating a fault in the system bus of the standby system. If there is such fault information, it is determined that the standby system has a fault, and therefore, it is impossible to transfer data from the acting system to the standby system through the cross bus and bus interchange apparatuses. If the standby system has no fault, step A9 accesses all I/O devices of the standby system. Step A10 checks to see if an access Lo a specific I/O device of the standby system is abnormally terminated. If so, it is determined that the specific I/O device has a fault, and if not, it is determined that the abnormal access termination that triggered the fault process was caused not by fault but by congestion.

Figure 24:
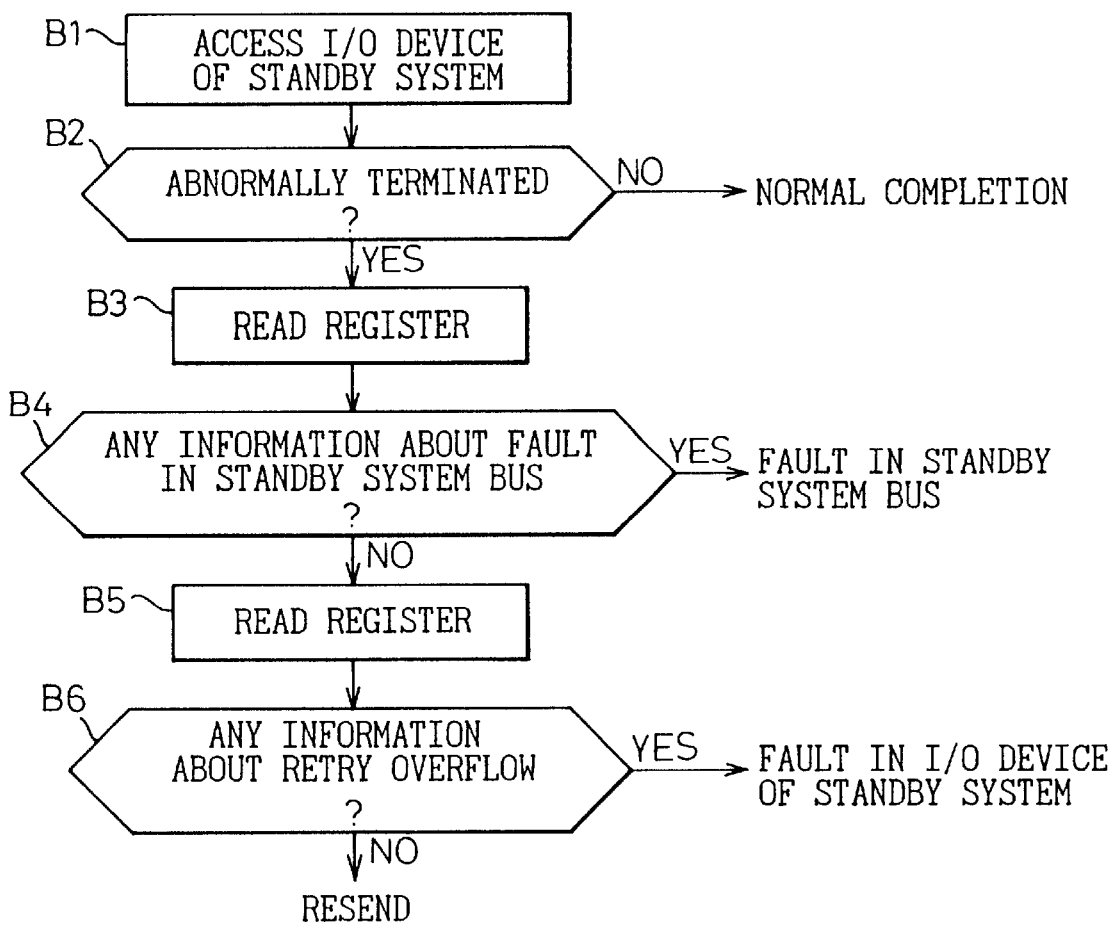
FIG. 24 is a flowchart showing a retry process according to the present invention.

FIG. 24 is a flowchart showing a retry process according to the present invention. Step B1 accesses an I/O device of the standby system. Step B2 checks to see if the access is abnormally terminated. If not, the access meets a normal completion, and the retry process ends. If the access is abnormally terminated, step B3 reads fault information from the bus interchange apparatus connected to the standby system. Namely, the response reception controller 16 (FIG. 2) applies the read enable signal "Reg_Re" to the register 5 and reads fault information therefrom. Step B4 checks to see if there is fault information indicating a fault in the system bus of the standby system. If there is, it is impossible to carry out the retry process, and therefore, the process ends.

If there is no fault in the system bus of the standby system, step B5 reads retry-overflow information from the bus interchange apparatus. Step B6 checks the data read out of the register 5 to see if it contains the retry-over signal "Retry_ovf" of FIG. 16, or the decision signal "retry_counter_co1" or "retry_counter_co2." If there is such retry-over information, the standby I/O device has a fault, and the retry process is not achieved. If there is no such retry-over information, the retry process is carried out.

The present invention is not limited to the embodiments mentioned above. Many modifications and combinations of the embodiments are possible. The buffers 3 and 4 of the bus interchange apparatus may be existing FIFO memories. The functions of the logic circuits of the embodiments may be realized with the operational functions of a processor.

As explained above, the bus interchange apparatus of the present invention is used with a cross bus to connect two system buses of a dual system to each other. The bus interchange apparatus has the first bus controller 1 connected to one of the system buses, the second bus controller 2 connected to the cross bus, the buffers 3 and 4 arranged between and connected to the first and second bus controllers 1 and 2, for relaying information between them, and the register 5 directly accessible from the first and second bus controllers 1 and 2 to write fault information thereto. Even if the buffers 3 and 4 are full, the register 5 is accessible from the system bus and cross bus, to write and read fault information to and from the register 5. The present invention is capable of easily locate a fault and carrying out a reset operation at the fault location without resetting the dual system as a whole. Namely, the present invention is capable of correcting faults without interrupting services provided by the dual system.

The reception controllers 6 and 7 and transmission controllers 8 and 9 of the first and second bus controllers 1 and 2 determine whether an access is to the buffers 3 and 4 or to the register 5, to access the register 5 even if the buffers 3 and 4 are full. One of the systems is able to read fault information about the other system from the register 5 without regard to the buffers 3 and 4, to easily locate a fault, if any.

If the transmission of data read out of the buffers 3 and 4 is abnormally terminated, a retry operation is carried out. If the number of retry operations exceeds a retry limit, a retry-over signal is written into the register 5. By reading the retry-over signal out of the register 5, it is easy to determine whether or not the retry operation to read the buffers 3 and 4 must be continued.

The number of retry operations may individually be counted for access sources such as processors and I/O devices, and a retry limit may be set for each access source. Optimum retry limits are determined according to the characteristics of access sources and are held in registers, respectively. Whenever a count exceeds a corresponding retry limit, a retry-over signal is written into the register 5. By checking the register 5, it is possible to determine whether or not a retry operation must be repeated. In this way, the present invention easily finds the cause of a retry-over state and determines whether or not it is due to temporary congestion, to thereby control information transfer between the two systems.

Although the present invention has been disclosed and described by way of embodiments, it is apparent to those skilled in the art that other embodiments and modifications of the present invention are possible without departing from the spirit or essential features thereof.

What is claimed is:

1. A bus interchange apparatus for connecting first and second system buses to each other through a cross bus to interchange information between the first and second system buses, comprising:

a first bus controller connected to one of the first and second system buses;

a second bus controller connected to the cross bus;

a buffer arranged between and connected to the first and second bus controllers, for relaying information between the first and second bus controllers; and a register connected to the first bus controller and to the second bus controller and directly accessible from the first and second bus controllers, for holding fault information;

wherein the first and second bus controllers have each:

a reception controller for writing information, which is to be transferred from a sender to a receiver, into the buffer when the buffer is not full, and when the buffer is full, sending a busy signal to the sender without writing the information into the buffer; and a transmission controller for reading the information out of the buffer and transmitting the same to the receiver, wherein:

the reception controller writes fault information into, etc., the register in response to a corresponding write request irrespective of whether or not the buffer is full; and the transmission controller reads fault information, etc., out of the register in response to a corresponding read request and sends out the read information irrespective of whether or not the buffer is full.

2. A bus interchange apparatus for connecting first and second system buses to each other through a cross bus to interchange information between the first and second system buses, comprising:
- a first bus controller connected to one of the first and second system buses;
- a second bus controller connected to the cross bus;
- a buffer arranged between and connected to the first and second bus controllers, for relaying information between the first and second bus controllers; and
- a register connected to the first bus controller and to the second bus controller and directly accessible from the first and second bus controllers, for holding fault information;
- wherein the transmission controller has:
  - a counter for counting a number of retry operations that are carried out when the information read out of the buffer and transmitted to the receiver is not normally received by the receiver; and
  - means for writing a retry-over signal into the register when the number of retry operations exceeds a retry limit.

3. The apparatus of claim 2, wherein the transmission controller has:
- a limit register for storing a retry limit; and
- coincidence means for comparing the number of retry operations counted by the counter with the retry limit, and if they agree with each other, providing the retry-over signal.

4. The apparatus of claim 2, wherein:
- the transmission controller has an identification means for identifying a sender;
- a plurality of counters provided for each sender for counting the number of retry operations carried out for the sender identified by the identification means;
- a limit register provided for each of the counters, for storing a retry limit for the counter; and
- a coincidence means provided for each of the counters, for comparing the number of retry operations counted by the counter with the corresponding retry limit, and when they agree with each other, providing a retry-over signal.

5. A bus interchange apparatus for connecting first and second system buses to each other through a cross bus to interchange information between the first and second system buses, comprising:
- a first bus controller connected to one of the first and second system buses;
- a second bus controller connected to the cross bus;
- a buffer arranged between and connected to the first and second bus controllers, for relaying information between the first and second bus controllers; and
- a register connected to the first bus controller and to the second bus controller and directly accessible from the first and second bus controllers, for holding fault information;
- wherein the reception controller has:
  - means for determining whether or not an access for writing information is to the register; and
  - means for writing the information into the buffer when the access is not to the register and when the buffer is full, and writing the information into the register irrespective of whether or not the buffer is full when the access is to the register.

6. A dual system having first and second system buses that are connected to processors, respectively, comprising:
- a bus interchange apparatus for connecting the first and second system buses to each other through a cross bus, having a first bus controller connected to one of the first and second system buses, a second bus controller connected to the cross bus, a buffer arranged between and connected to the first and second bus controllers, for relaying information between the first and second bus controllers, and a register to which fault information is written and which is accessible directly from the first and second bus controllers; and
- means for enabling one of the system buses serving as a sender to refer to the register to see whether there is a fault in a location to which the bus interchange apparatus is connected, when the sender receives no response or an error response from the bus interchange apparatus in response to a request for transferring data from the sender to the other system bus serving as a receiver;
- means for enabling one of the system buses serving as a sender to refer to the register to see whether there is a fault in a location to which the bus interchange apparatus is connected when the sender receives no response or an error response from the bus interchange apparatus in response to a request for transferring data from the sender to the other system bus serving as a receiver.

7. A dual system having first and second system buses that are connected to processors, respectively, comprising:
- a bus interchange apparatus for connecting the first and second system buses to each other through a cross bus, having a first bus controller connected to one of the first and second system buses, a second bus controller connected to the cross bus, a buffer arranged between and connected to the first and second bus controllers, for relaying information between the first and second bus controllers, and a register to which fault information is written and which is accessible directly from the first and second bus controllers; and
- means for enabling one of the system buses serving as a sender to refer to the register to see whether there is a fault in a location to which the bus interchange apparatus is connected when the sender receives no response or an error response from the bus interchange apparatus in response to a request for transferring data from the sender to the other system bus serving as a receiver;
- means for enabling one of the system buses serving as a sender to refer to the register and terminate data transfer when the register holds a retry-over signal and indicates a fault in t he other system bus serving as a receiver when the sender receives no response or an error response from the bus interchange apparatus in response to a request for transferring data from the sender to the receiver.

8. A dual system having first and second system buses that are connected to processors, respectively, comprising:
- a bus interchange apparatus for connecting the first and second system buses to each other through a cross bus, having a first bus controller connected to one of the first and second system buses, a second bus controller connected to the cross bus, a buffer arranged between and connected to the first and second bus controllers, for relaying information between the first and second bus controllers, and a register to which fault information is written and which is accessible directly from the first and second bus controllers; and means for enabling one of the system buses serving as a sender to refer to the register to see whether there is a fault in a location to which the bus interchange apparatus is connected, when the sender receives no response or an error response from the bus interchange apparatus in response to a request for transferring data from the sender to the other system bus serving as a receiver;

wherein the first and second bus controllers each have:

a reception controller for writing information, which is to be transferred from a sender to a receiver, into the buffer when the buffer is not full, and when the buffer is full, sending a busy signal to the sender without writing the information into the buffer; and a transmission controller for reading the information out of the buffer and transmitting the same to the receiver, wherein:

the reception controller writes fault information into the register in response to a corresponding write request irrespective of whether or not the buffer is full; and the transmission controller reads fault information out of the register in response to a corresponding read request and sends out the read information irrespective of whether or not the buffer is full.

9. The dual system of claim 8, wherein the transmission controller has:

a counter for counting a number of retry operations that are carried out when the information read out of the buffer and transmitted to the receiver is not normally received by the receiver; and means for writing a retry-over signal into the register when the number of retry operations exceeds a retry limit.

10. The dual system of claim 9, wherein the transmission controller has:

a limit register for storing a retry limit; and coincidence means for comparing the number of retry operations counted by the counter with the retry limit, when they agree with each other, providing the retry-over signal.

11. The dual system of claim 9, wherein:

the transmission controller comprises an identification means for identifying a sender;

a plurality of counters provided for each sender for counting the number of retry operations carried out for the sender identified by the identification means;

a limit register provided for each of the counters, for storing a retry limit for the counter; and a coincidence means provided for each of the counters, for comparing the number of retry operations counted by the counter with the corresponding retry limit, and when they agree with each other, providing a retry-over signal.

12. The dual system of claim 8, wherein the reception controller has:

means for determining whether or not an access for writing information is to the register; and means for writing the information into the buffer when the access is not to the register and when the buffer is not full, and writing the information into the register irrespective of whether or not the buffer is full when the access is to the register.

* * * * *